United States Patent [19]

Ota et al.

[11] Patent Number: 5,485,612
[45] Date of Patent: Jan. 16, 1996

[54] METHOD AND APPARATUS FOR ASSIGNING PROCESSORS IN PARALLEL COMPUTER SYSTEM

[75] Inventors: Hiroshi Ota, Tokyo; Kousuke Sakoda, Hino; Tetsuo Saito, Zama; Eiichiro Maeda, Hitachi; Toshiyuki Yamamoto, Kawasaki, all of Japan

[73] Assignees: Hitachi, Ltd.; Hitachi Microcomputer System Ltd., both of Tokyo; Hitachi Nuclear Engineering Co., Ltd., Ibaraki, all of Japan

[21] Appl. No.: 830,673

[22] Filed: Feb. 4, 1992

[30] Foreign Application Priority Data

Feb. 13, 1991 [JP] Japan ................................ 3-019749

[51] Int. Cl.⁶ .......................... G06F 13/00; G06F 7/38
[52] U.S. Cl. ................ 395/650; 364/231.9; 364/DIG. 1; 364/931.41; 364/DIG. 2
[58] Field of Search .................................. 395/650, 700

[56] References Cited

U.S. PATENT DOCUMENTS

| | | | |
|---|---|---|---|
| 4,344,134 | 8/1982 | Barnes | 364/200 |
| 4,766,534 | 8/1988 | DeBenedictis | 364/200 |
| 4,843,540 | 6/1989 | Stolfo | 364/200 |
| 4,845,744 | 7/1989 | DeBenedictis | 379/221 |
| 4,860,201 | 8/1989 | Stolfo | 364/200 |
| 4,910,669 | 3/1990 | Gorin et al. | 364/200 |

OTHER PUBLICATIONS

"An Invitation to the World of PAX" by Tsutomu Hoshino, IEEE 1986, pp. 68–79.
"Design of HM²P—A Hierarchical Multimicroprocessor for General–Purpose Applications" by Shin et al, IEEE 1982, pp. 1045–1053.
"A Parallel Processing Scheme For Tree–Structured Image Generation System" by Hiroshi Deguchi et al, IEEE 1988, pp. 569–572.
"Parallelism and Array Processing" by Vasilii Zakharov, IEEE 1984, pp. 45–78.
"A Reconfigurable and Hierarchical Parallel Processing Architecture: Performance Results for Stereo Vision" by Alok N. Choudhary et al, IEEE 1990, pp. 389–393.
"The ETH–Multiprocessor EMPRESS: A Dynamically Configurable MIMD System" by Richard E. Buehrer IEEE 1982 pp. 1035–1044.
Gilbert, John R. "Optimal Expression Evaluation for Data Parallel Architectures," Journal of Parallel and Distributed Computing, vol. 13, No. 1, Sep. 1991, pp. 58–64. (Provided in English).

Primary Examiner—Kevin A. Kriess
Assistant Examiner—Michael T. Richey
Attorney, Agent, or Firm—Fay, Sharpe, Beall, Fagan, Minnich & McKee

[57] ABSTRACT

A computer system has a plurality of processors, each having a local memory. An expression is represented by operands and operations and is expressed in a form of a tree. The operands are assigned to leaf nodes of the tree and the operations are assigned to interior nodes. Processors which store an operand represented by a leaf node are assigned to the leaf node. The tree is traced in a bottom-up fashion to determine a set of candidate processors to be assigned to each of the interior nodes. The candidate processors are determined from processors which are assigned to children nodes of each interior node in accordance with a majority method. The majority method is based on a rule that a processor which is most frequently assigned to the children nodes of an interior node is determined as a candidate processor. A root processor is assigned to a root node of the interior nodes from the candidate processors. The tree is then traced in a top-down fashion to determine definitely one processor to be assigned to each interior node from the candidate processors determined for the corresponding interior node.

6 Claims, 28 Drawing Sheets

F I G. 17A 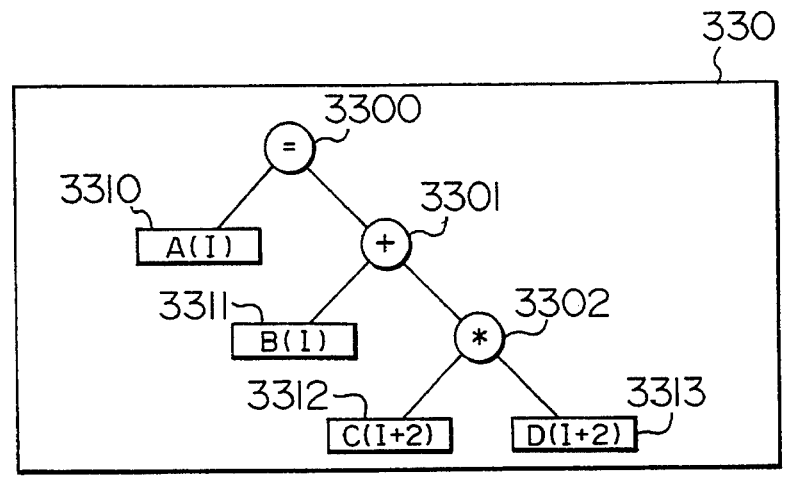
F I G. 17B 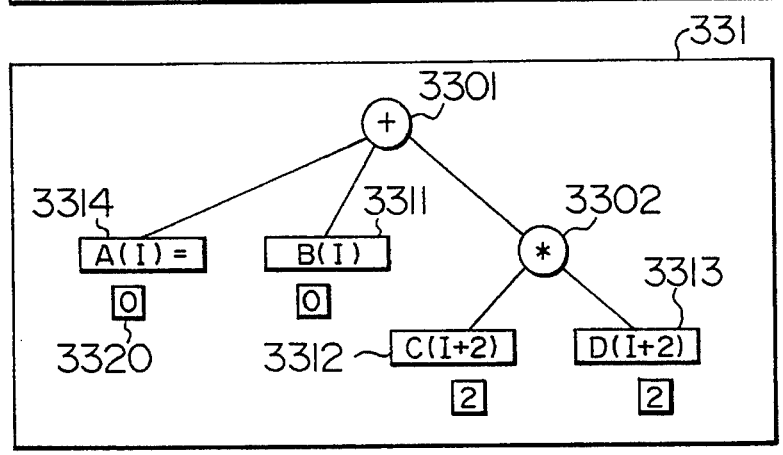
F I G. 17C 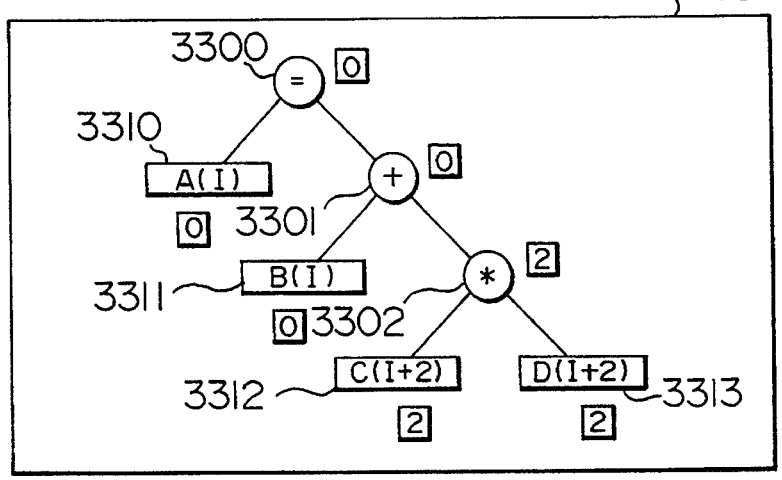

```
      DO 10  I = 1, 1022
10    A(I) = B(I) + C(I+2) * D(I+2)
```
600

|  | ASSINGNED PE IDENTIFIER |
|---|---|
| `DO 10 I = 1, 1022`<br>`  {TRANSFER OF C(I+2) D(I+2) TO TMP(I)}`<br>`  {WAITING FOR TRANSFER OF TMP(I)}`<br>`10 A(I) = B(I) + TMP(I)` | 2<br>0<br>0 |

610    6100

|  | ASSINGNED PE IDENTIFIER |
|---|---|
| `DO 10 I = 1, 1022`<br>`  {TRANSFER OF C(I+2) TO C'(I)}`<br>`  {TRANSFER OF D(I+2) TO D'(I)}`<br>`  {WAITING FOR TRANSFER OF C'(I), D'(I)}`<br>`10 A(I) = B(I) + C'(I) * D'(I)` | 2<br>2<br>0<br>0 |

```
    :
IF 3<=i<=1024 THEN
   {TRANSFER OF C(i) * D(i) TO TMP(i-2)}
ENDIF
IF 1<=i<=1022 THEN
   {WAITING FOR TRANSFER OF TMP(i)}
   A(i) = B(i) + TMP(i)
ENDIF
    :
```
620

FIG. 24B
PRIOR ART

```
    :
IF 3<=i<=1024 THEN
   {TRANSFER OF C(i) TO C'(i-2)}
   {TRANSFER OF D(i) TO D'(i-2)}
ENDIF
IF 1<=i<=1022 THEN
   {WAITING FOR TRANSFER OF C'(i),D'(i)}
   A(i) = B(i)+C'(i)*D'(i)
ENDIF
    :
```
621

METHOD AND APPARATUS FOR ASSIGNING PROCESSORS IN PARALLEL COMPUTER SYSTEM

BACKGROUND OF THE INVENTION

The present invention generally relates to software adapted to run on a distributed-memory type parallel computer system. More particularly, this invention is concerned with a parallelization translator tool (such as a parallelizing compiler, parallelizing translator, parallelization supporting tool and the like) for translating a program described to be executed by a serial processing computer system into a program susceptible to execration by a distributed-memory parallel computer.

There is known a computer system constituted of a plurality of processing elements in which each of the processing elements (hereinafter referred to as PE for short) is provided with a memory. This type of computer system is known as a distributed-memory type parallel computer. The memory provided in association with each of the PEs is termed the local memory.

For executing processings in the distributed-memory type parallel computer system, the data used is allocated distributively to the local memories of the individual PEs, respectively, wherein processing such as arithmetic operations and others are executed by the PEs in parallel to one another. In that case, when there arises a need for making reference to the data allocated to the local memory of the other PE, the data has to be transferred to the requesting PE through an interprocessor or inter-PE communication.

As a processing scheme or system for a large scale array appearing, for example, in scientific data processing or the like, there is proposed a system in which individual elements of the array ape distributively allocated to the PEs, respectively, wherein the processings are performed in parallel on an element-by-element basis. In the following processing procedure for the array, elements will be described on the presumption that an array element allocation method has already been given.

By way of example, consider a processing described in a serial processing FORTRAN program as follows:

DIMENSION $A(1024), B(1024), C(1024)$
DO 10 $I = 1,1022$
$A(I) = B(I) + C(I + 2)$

It is assumed that this processing is to be executed by a parallel computer. Further, it is assumed that the elements of the arrays A, B and C ape serially allocated one by one to the local memories of the individual PEs, respectively, as illustrated fin FIG. 5 of the accompanying drawings.

In the parallel computer, this loop is executed in a manner described below. For each of "I"s, a value of $C(I+2)$ is transferred from the PE (hereinafter referred to as PE(2)) having $C(I+2)$ to the PE (referred to as PE(0)) having $A(I)$ and $B(I)$, whereon the PE(0) executes an assignment statement by using the value or $C(I+2)$ transferred thereto. These processings are executed in parallel by the PEs for each of "I"s.

The processing described above is executed in accordance with a program oriented for the parallel computer. For creating an equivalent program for the parallel computer based on a program described for serial processing, a parallelizing compiler, a parallelization supporting tool or the like is employed. The parallelizing compiler finds out from a serial processing program those portions which can be parallelized and performs allocation of the portions to the individual PEs, insertion of inter-PE communication and so forth to thereby output a parallel processing program. On the other hand, the parallelization supporting tool is designed to support or aid the operator in manually creating the parallel program by analyzing the program and forwarding various information in case the optimum parallelization can not be realized with only the aid of the parallelizing compiler.

When two or mope data allocated to other PEs ape to be referred to during execution of an expression, a part of operation appearing in the expression must be executed by another PE. By way of example, consider a method of executing by a parallel computer a processing mentioned below:

DO 10 $I = 1,1022$
$A(I) = B(I) + C(I + 2) \times D(I + 2)$

It is assumed that the elements of the arrays A, B, C and D are allocated serially one by one to the local memories of the individual PEs, as in the case of the example shown in FIG. 5. In that case, $A(I)$ and $B(I)$ are resident on a same PE, while $C(I+2)$ and $D(I+2)$ are also on a same PE regardless of the value which "I" assumes.

There are conceivably two methods for executing the loop by a parallel computer system. According to a first method, values of $C(I+2)$ and $D(I+2)$ are transferred from the PE(2) to the PE(0), whereon assignment statement is executed by the PE(0) by using the values of $C(I+2)$ and $D(I+2)$ transferred to the PE(0). On the other hand, according to a second method, a value of a partial expression of $C(I+2) \times D(I+2)$ is determined for each "I" and then transferred to the PE(0) which executes then the assignment statement by using the value as transferred thereto. In other words, the first method features the allocation of all the operations appearing in the expression to the PE(0), while the second method features the allocation of multiplication appearing in the expression to the PE(2) with the addition being allocated to the PE(0).

In the case of the first method, the number of data to be transferred is two for each "I". In contrast, in the second method, the number of data to be transferred is one. In this conjunction, it is noted that in the case of the distributed-memory type parallel computer, the number of the inter-PE data transfers should be as small as possible because the inter-PE data transfer takes lots of time when compared with the reference to the data within the PE. Accordingly, it can be said that the second method is excellent over the first in this respect.

As will be understood from the abovementioned example, the number of times the data is transferred can be reduced by contriving a method of assigning the PEs to operations appearing in an expression. An article in which a method for optimal PE assignment is discussed, is by John R. Gilbert and Robert Schreiber, "Optimal Expression Evaluation for Data Parallel Architectures", Journal of Parallel and Distributed Computing, Vol. 13, No. 1, pp. 58–64, September, 1991. According to this known method, an expression is represented in the form of a tree having leaves (leaf nodes) representing data and interior nodes representing operators. At first, the tree is traced in a bottom-up fashion to attach each of the interior nodes with a set of candidates of PEs to be assigned to the operation represented by each interior node. Subsequently, the tree is traced in a top-down fashion to determine the PE which is to be assigned to the operation represented by the interior node.

In the case of the system disclosed in the abovementioned article, however, operations in the expression are limited to those having two operators such as the four arithmetic operations. Thus, although the method disclosed in the above article can be applied to such an expression as given by $$B(I)+C(I+2)\times D(I+2)$$

it can not be applied to an expression which contains a function FUN having three parameters such as follows:

$$B(I)+FUN(C(I+2), D(I+2), E(I+1))$$

As an example of the function having three or more parameters in an expression, there may be mentioned a function for determining solutions of a quadratic equation by using three coefficients as parameters.

Further, in the abovementioned article, discussion is also made of a method of determining the PE assignment in the case where the sequence or order of the operations can be altered by making use of the commutative law of the four operations. Unfortunately, this method can not always ensure the optimum assignment.

It is further noted that in the abovementioned article, discussion is also directed to such assignment of the PEs to the operation that the cost involved in the inter-PE data transfers, which is not constant but variably dependent on the transfer source PE and the transfer destination PE, can be reduced to a minimum. In that case, however, the cost is required to meet the condition of "robustness".

SUMMARY OF THE INVENTION

It is an object of the present invention to provide a method and an apparatus which is capable of realizing an optimal PE assignment even in the case of an expression including a function (operation) having three or more parameters (operands).

Another object of the invention is to provide a method and an apparatus which are capable of realizing an optimal PE assignment when the execution sequence or order of operations can be altered or permutated by making use of the commutative/associative laws.

A still another object of the invention is to provide a method and an apparatus which are capable oft realizing an optimal PE assignment so that the cost involved in the inter-PE data transfer can be minimized even when the cost does not meet a specific condition.

In view of the above and other objects which will be apparent as the description proceeds, it is proposed according to an aspect of the present invention to provide a processor assignment method which comprises a first step oft representing an expression in the form of a tree having leaves (leaf nodes) corresponding to data and interior nodes corresponding to operations and tracing the tree in a bottom-up fashion to attach each oft the interior nodes with a set of candidates for the PE (hereinafter referred to as the candidate PEs) to be assigned to an operation at the interior node and a second step of tracing the tree in a top-down fashion to determine the PEs to be assigned to the operations at the interior nodes.

Further, in view of the above objects, it is taught according to another aspect oft the invention that in conjunction with the first step of the PE assignment method mentioned above that (1) the candidate PEs for a leaf are determined to be only the PEs to which the data represented by that leaf are allocated, and (2) the candidate PEs for an interior node of concern are determined as all the candidate PEs for the greatest number of children nodes of the interior node of concern.

To achieve the above objects, it is further proposed according to still another aspect of the invention in conjunction with the second step off the abovementioned PE assigning method that (1) when the interior node of concern is a root node, one PE selected arbitrarily from a set of the candidate PEs for the interior node of concern is determined as the PE to be assigned to the node of concern and (2) when the interior node of concern is not a root node and when a PE assigned to a parent node of the interior node of concern is contained in the set of the candidate PEs for the interior node of concern, the PE assigned to the parent node is determined as the PE to be assigned to the interior node of concern, and (3) unless the interior node of concern is the root node and unless the PE assigned to the parent node of the interior node of concern is contained in the set of the candidate PEs for the interior node of concern, one PE selected arbitrarily from the set of the candidate PEs for the interior node of concern is determined as the PE to be assigned to that interior node.

Furthermore, to achieve the above objects, it is taught according to still another aspect of the invention to provide a processor assignment method which comprises a first step of representing an expression in the form of a tree having leaves corresponding to data and interior nodes corresponding to operators and merging together a plurality of nodes corresponding to a plurality of operations which are permutable in respect to the order of execution, a second step of tracing the tree in a bottom-up fashion to attach a set of candidate PEs to each of the interior nodes, a third step of tracing the tree in a top-down fashion to determine the PE to be assigned to the operation of the interior node of concern, and a fourth step off splitting the merged node to generate a new node and determining the PEs to be assigned to the new node.

Additionally, for achieving the above objects, it is taught according to a still further aspect of the invention to provide processor assignment method which comprises a first step of representing an expression in the form of a tree having leaves corresponding to data and interior nodes corresponding to operators and tracing the tree in a bottom-up fashion for attaching an combination of a interior node and a PEs transfer cost involved in execution of operation at an interior node of concern by the associated PE, and a second step of tracing the tree in a top-down fashion to determine the PE to be assigned to the operation of the interior node of concern.

The candidate PEs determined by tracing the tree in bottom-up fashion each have such nature or property that assignment of any one of the candidate PEs to a node of concern constitutes the necessary and sufficient condition for evaluating the value of an expression represented by a subtree having the node of concern as the root node with the least number off data transfers. Besides, since the PE assignment is determined during the tree tracing in the top-down fashion such that the number of required data transfers with the parent node becomes minimal, the PE assignment as a whole can be realized with the least number of data transfers.

BRIEF DESCRIPTION OF THE DRAWINGS

FIGS. 17A, 17B and 17C are diagrams for illustrating in what manner assignment statements are processed;

FIGS. 24A and 24B are views showing an example of a PE-dedicated intermediate program in comparison with a conventional one;

FIG. 26 is a flow chart for illustrating a PE assignment processing in which the commutative/associative laws are made use of;

DESCRIPTION OF THE PREFERRED EMBODIMENTS

Figure 4:
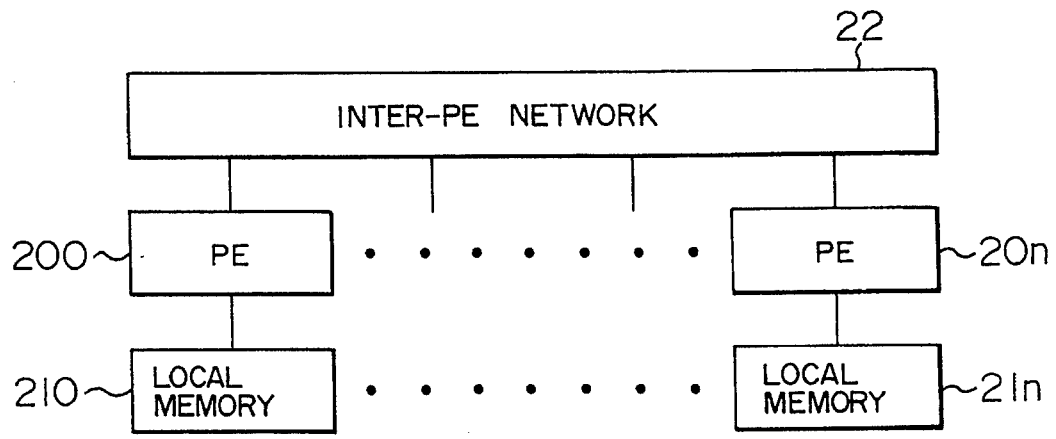
FIG. 4 is a schematic block diagram showing a general arrangement of a parallel computer system to which the present invention can find application.

FIG. 4 is a schematic block diagram showing, by way of example, a general arrangement of a parallel computer system (parallel processing system) to which the present invention can be applied. The parallel computer system comprises a plurality of processing elements (hereinafter referred to as PE for short) 200 to 20n, local memories 210 to 21n provided in association with the PEs, respectively, and an inter-PE network 22. Data transfer among the PEs can be performed through the inter-PE network 22. It is assumed that the individual PEs are affixed with respective identification numbers or identifiers in the order starting from "#1". These identifiers will be termed "absolute PE identifiers".

Figure 5:
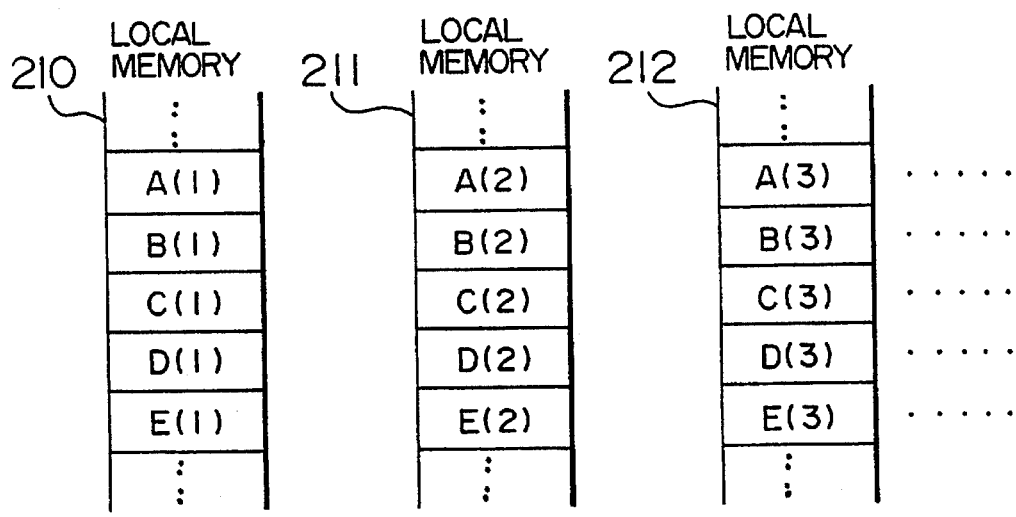
FIG. 5 is a view for illustrating an example of distributed allocation of array elements to local memories of PEs.

FIG. 5 is a view for illustrating an example of distributed assignment of elements of arrays A, B, C, D and E to the local memories 210, 211, 212, etc. of the individual PEs. In this example, array data elements are allocated sequentially one by one to each of the PEs.

In the following, a method is described in which when an expression composed of array data allocated distributively as mentioned above is given, the PEs are assigned to operations contained in the expression so that the expression can be evaluated with a minimum number of data transfers. The PE assignment method may be applied to any of the given expressions. However, for convenience of description, it is assumed, by way of example only, that the PE assignment method is applied to realization of an expression which reads as follows:

FUN (A(I+1)×B(I+1)+C(I+2), D(I+3), E(I+2))

In this connection, the PE having the array element affixed with a subscript "I+k" (where k is an integer) will be represented by PE(k) with k being termed "relative PE identifier". In the following description, the relative PE identifier will simply be referred to as "PE identifier" and this identifier is used for discriminative identification of the PE. Description will first be made of evaluation of a value of the expression. Assignment of the value to other variables will be described later on.

Figure 6:
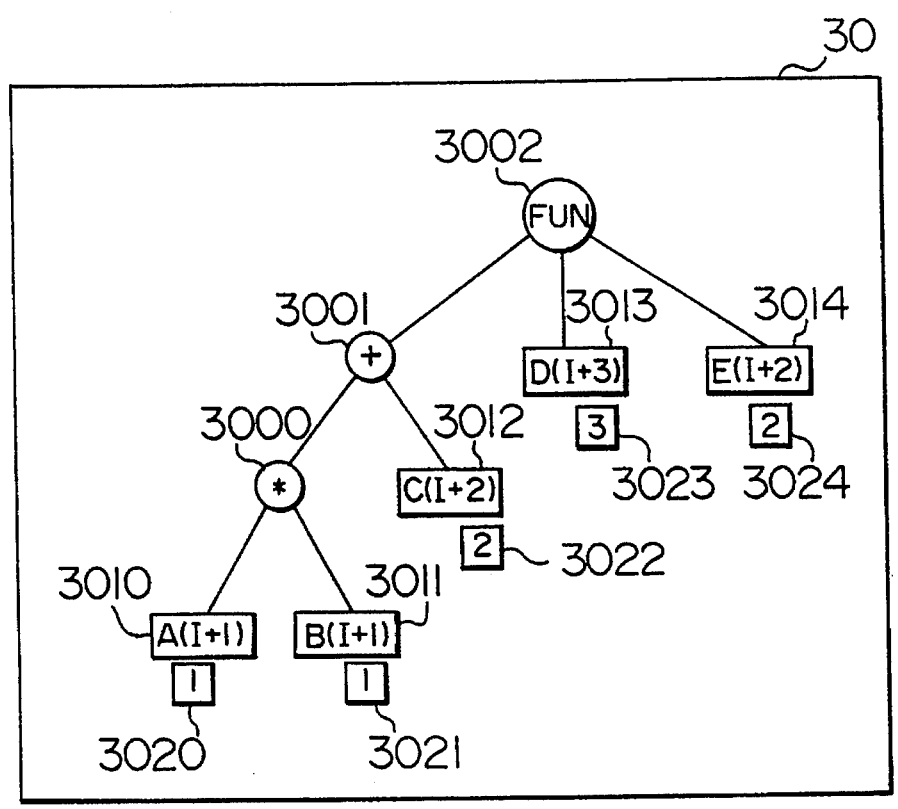
FIG. 6 is a diagram showing, by way of example, representation of an expression in the form of a tree.

It is assumed that the expression is given in the form of a tree having data at leaf nodes (also referred to simply as leaf or leaves) and operators at interior nodes. In case the expression is presented in the form of a character string, no difficulty will be encountered in translating the string into a tree configuration by using a conventional compiler technique. FIG. 6 is a diagram showing a representation of the aforementioned expression in the form of a tree. As will be seen in the figure, the leaf nodes 3010 to 3014 are attached with the PE identifiers 3020 to 3124 of the PEs allocated with the corresponding data.

Figure 1:
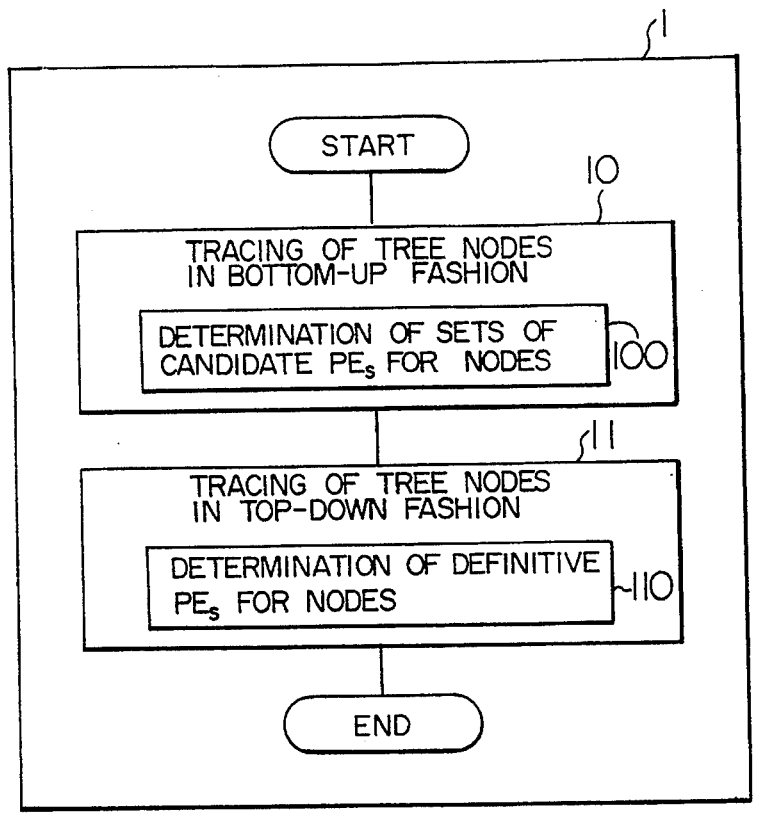
FIG. 1 is a flow chart illustrating a processing for assignment of PEs.

FIG. 1 is a flow chart illustrating a processing for assigning the PEs to the interior nodes when a tree such as mentioned above is given. Referring to FIG. 1, in a step 10, nodes of the tree are traced in a bottom-up fashion, and sets of "candidate PEs" for the individual nodes are determined in a step 100. The phrase "candidate PEs", it is intended to mean the candidates for the PE to be assigned to an associated node. In general, there exists a plurality of candidate PEs for a single node. In a step 11, the nodes of the tree are traced in a top-down fashion to thereby determine a "definitive PE" for each node of the tree in a step 110. The definitive PE means such PE which is definitively determined to be assigned to the relevant node.

Figure 2:
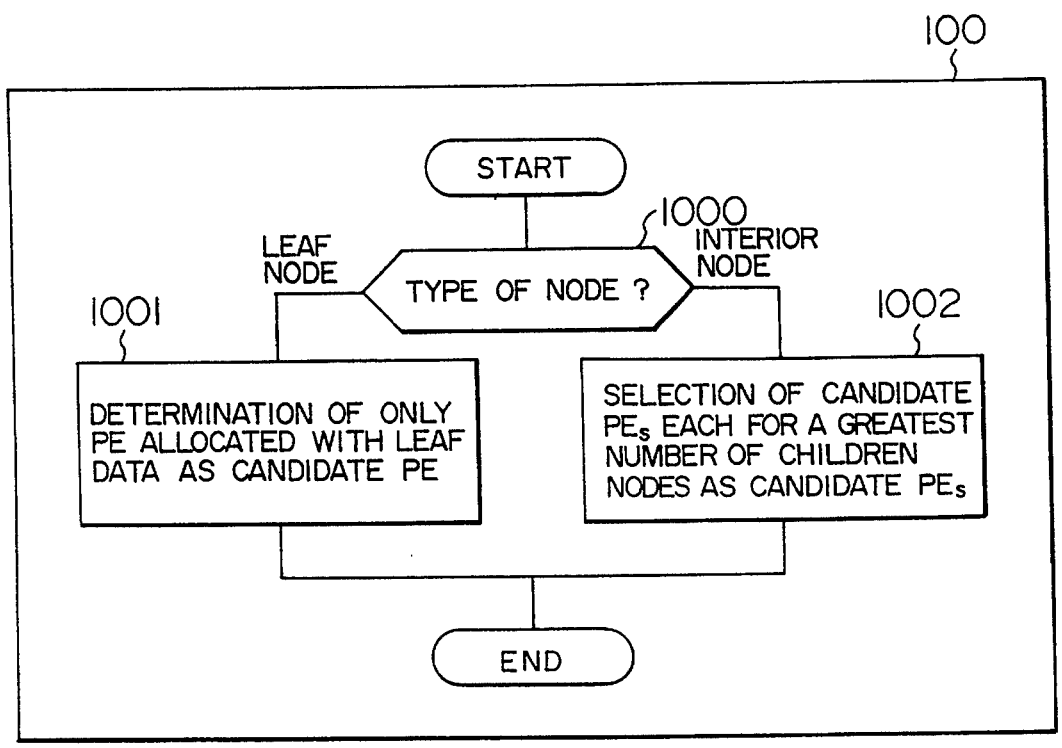
FIG. 2 is a flow chart illustrating a processing for determining sets of candidate PEs.

FIG. 2 is a flow chart illustrating in detail a processing for determining a set of candidate PEs for each node in the step 100 shown in FIG. 1. Referring to FIG. 2, in a step 1000, decision is made as to whether a node of concern is a leaf or an interior node. If the node is a leaf, the processing proceeds to a step 1001 while a step 1002 is executed when the node of concern is an interior node. In the step 1001, only one PE that has originally been allocated with the data represented by the leaf is selected as the candidate PE. On the other hand, in the step 1002, the candidate PEs for children nodes of the relevant interior node are examined, and the candidate PE assigned to the greatest number of the children nodes is determined as the candidate PE for that interior node (majority method). In case there exists two or more PEs which are the candidate PEs for the greatest number of children nodes, these PEs are all selected as the candidate PEs for the parent interior node.

Figure 7A:
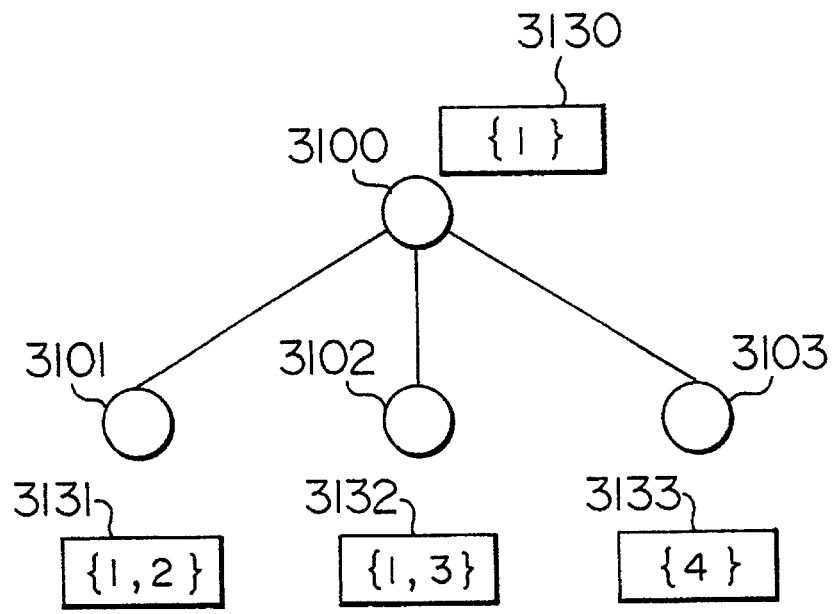
FIGS. 7A and 7B are diagrams for illustrating a method of determining candidate PEs for interior nodes of the tree.
Figure 7B:
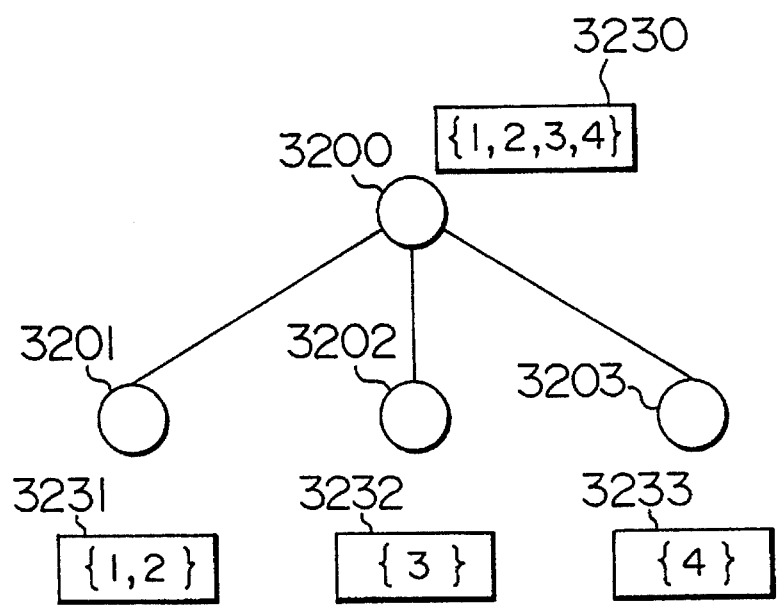

FIGS. 7A and 7B are diagrams for illustrating, by way of example, a method of determining the candidate PEs for interior nodes. The candidate PEs are designated by using the respective candidate PE identifiers. In the case of the example illustrated in FIG. 7A, an interior node 3100 has three children nodes 3101 to 3103, wherein sets 3131 to 3133 of the candidate PE identifiers for the children nodes include {1, 2 }, {1, 3} and {4}, respectively. The PE identifier "1" represents the candidate PE identifiers for two children nodes, i.e. the children nodes 3101 and 3102, while the PE identifiers "2", "3" and "4" represent, respectively, the candidate PE identifiers each for one child node 3101 or 3102 or 3103. Consequently, the candidate PE identifier for this interior node 3100 is "1" according to the majority method.

In the case of the example illustrated in FIG. 7B, an interior node 3200 has three children nodes 3201 to 3203, wherein sets 3231 to 3233 of the candidate PE identifiers for the children nodes are given by {1,2}, {3} and {4}, respectively. The PE identifiers "1", "2", "3" and "4" all represent the candidate PE identifiers each for one child node 3201 or 3202 or 3203. There exists no PE identifier representing the candidate PE identifier for two or more children nodes. Accordingly, all of "1", "2", "3" and "4" are determined as the candidate PE identifiers for this interior node 3200.

Figure 8:
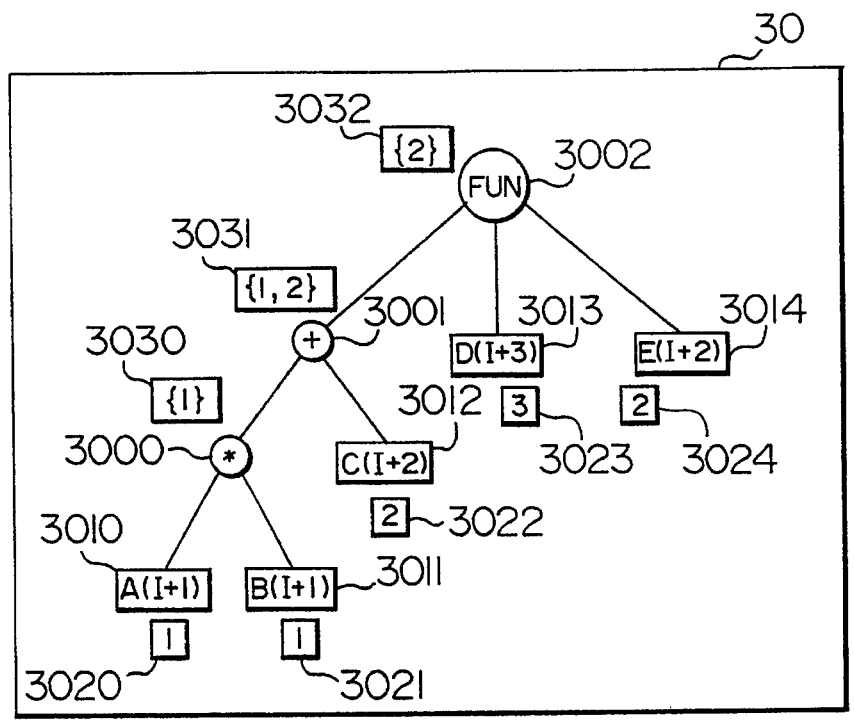
FIG. 8 is a diagram showing examples of candidate PE.

FIG. 8 is a diagram showing the tree 30 of FIG. 6 in the state in which the sets 3030 to 3032 of the candidate PE identifiers have been determined for individual interior nodes 3000 to 3002, respectively. In the figure, a numeral shown as parenthesized by a brace symbol "{}" represents the candidate PE identifier for the associated node. However, the candidate PE identifiers for the leaf nodes ape omitted from illustration because they are identical with the PE identifiers 3020 to 3024 of the PEs allocated with the data represented by the associated leaf nodes.

Figure 3:
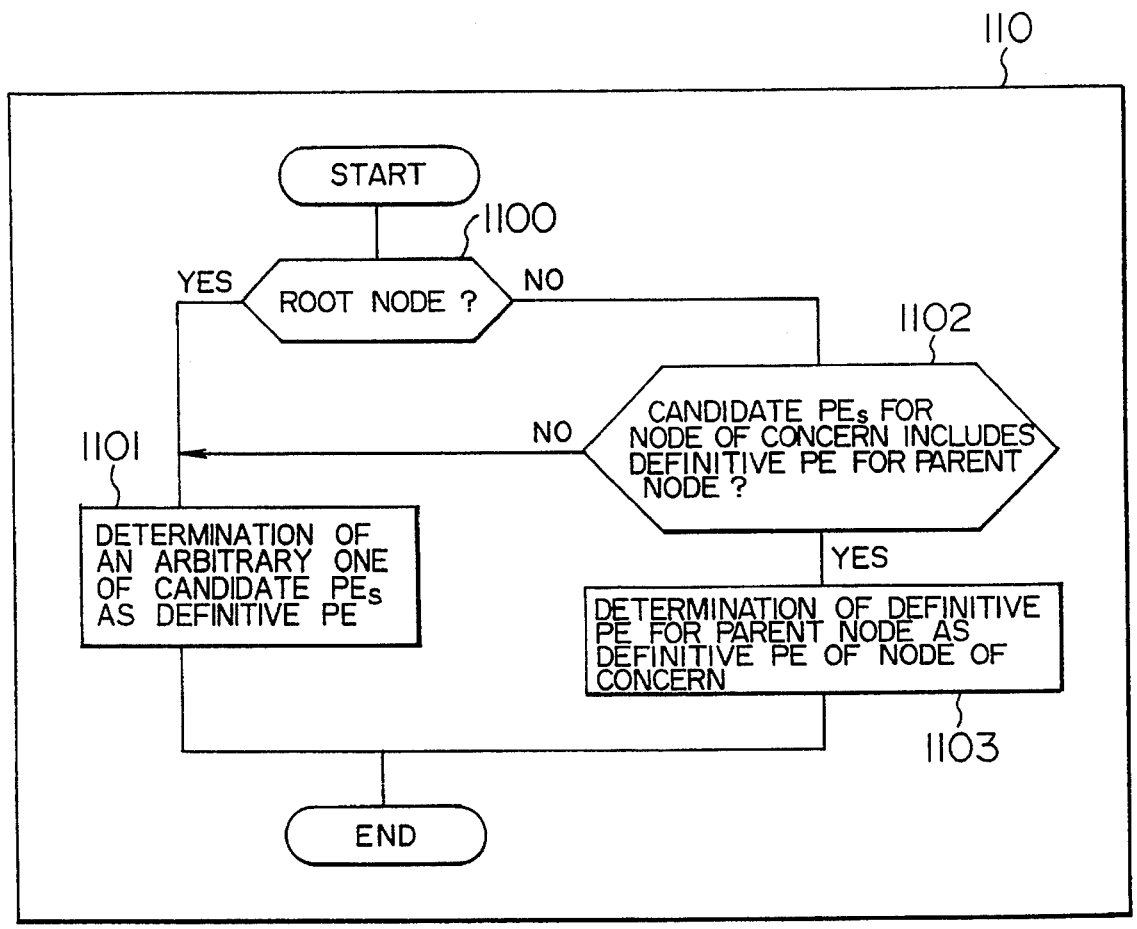
FIG. 3 is a flow chart illustrating a processing for determining definitive PEs.

FIG. 3 is a flow chart illustrating in detail a processing for determining the definitive PE for each node in the step 110 shown in FIG. 1. Referring to FIG. 3, in a step 1100, it is decided whether or not a node of concern is a root node. If so, the processing proceeds to a step 1101 while otherwise to a step 1102. In the step 1101, an arbitrary one of the candidate PEs for the root node is selected to be the definitive PE. On the other hand, in the step 1102, decision is made as to whether or not the definitive PE for the parent node is contained in the candidate PEs for the node under consideration (also referred to as the node of concern). If the result of this decision step 1102 is affirmative (YES), the processing proceeds to a step 1103 and, if otherwise (NO), to the step 1102 where the definitive PE is determined in the same manner as with the case of the root node. At this juncture, it should be mentioned that since the tree is traced in the top-down fashion, the definitive PEs for the parent nodes except for the root node have already been determined. In the step 1103, the definitive PE for the parent node is determined as that for the node of concern.

Figure 9:
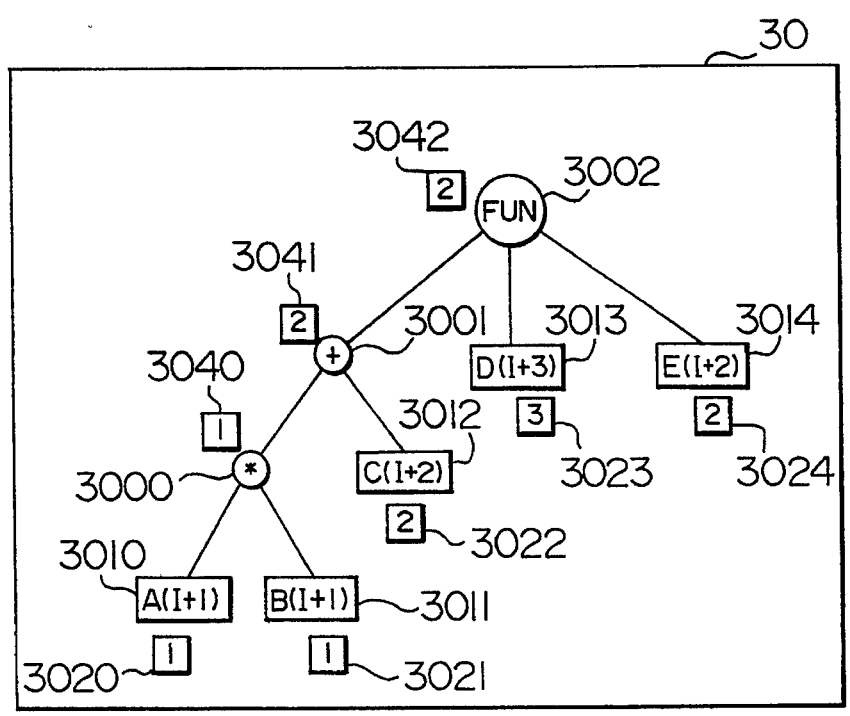
FIG. 9 is a diagram illustrating examples of definitive PE.

FIG. 9 is a diagram illustrating a manner in which the definitive PE identifiers 3040 to 3042 for the individual nodes of the tree are determined on the basis of the candidate PE identifiers 3030 to 3032 shown in FIG. 8. More specifically, at the root node 3002, the definitive PE identifier "2" 3042 is determined in the processing step 1101 shown in FIG. 3, while at an addition node 3001 located below, the definitive PE identifier "2" 3041 is determined through the processing in the step 1103 shown in FIG. 3. Further, at an underlying multiplication node 3000, the definitive PE identifier "1" 3040 is determined in accordance with the processing in the step 1101 shown in FIG. 3. The definitive PE identifiers for the leaf nodes 3010 to 3014 are identical with the identifiers 3020 to 3024 of the PEs allocated with the data corresponding to these leaves.

The definitive PE identifiers as determined can identify or indicate the PEs assigned to the operation of concern. In other words, these definitive PE identifiers indicate that the value of the expression represented by the tree 30 is evaluated in the following manner. Namely, a value of a partial expression A(I+1)×B(I+1) is evaluated by the PE(1) with the value resulting from the evaluation being transferred to the PE(2). Further, a value of D(I+3) is transferred from the PE(3) to the PE(2). Subsequently, operations at the two interior nodes 3001 and 3002 located above are executed by the PE(2) to thereby determine the value of the expression as a whole. At that time, the number of the transfers as involved is two for each "I".

Figure 10:
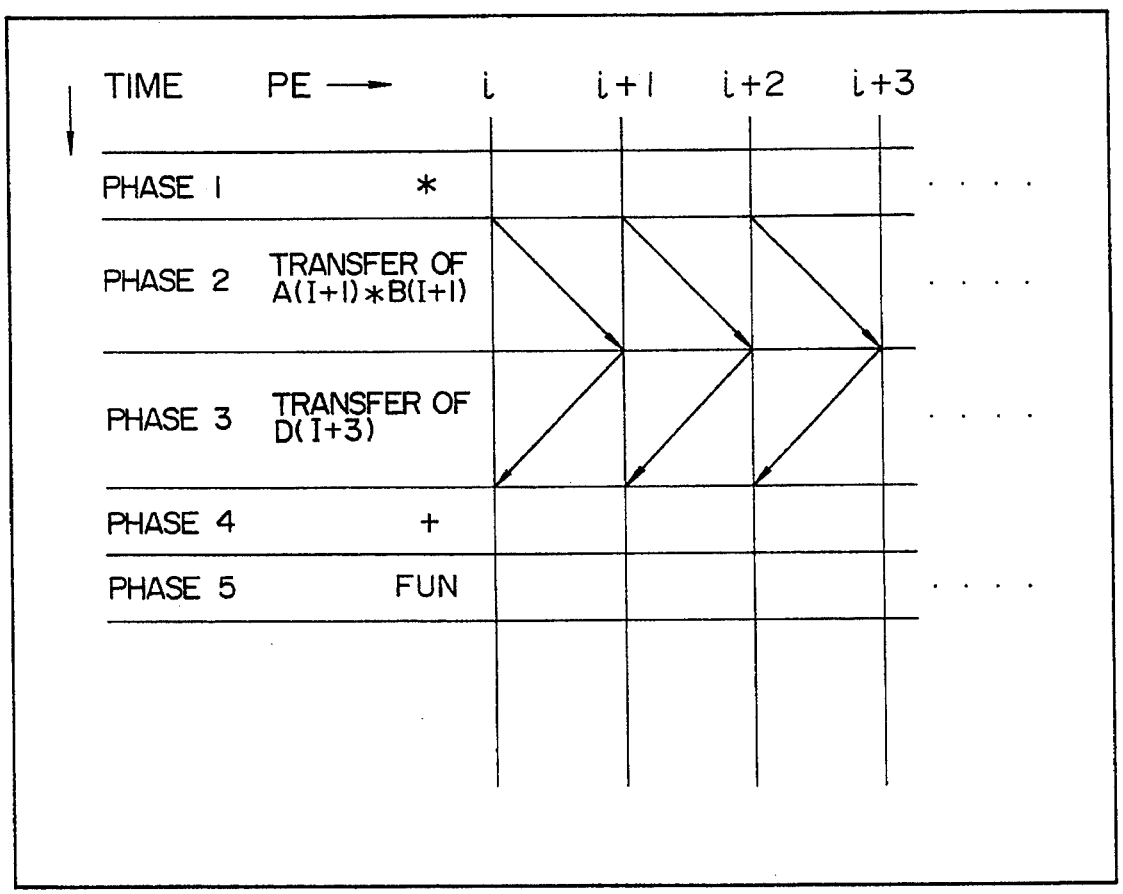
FIG. 10 is a time chart for illustrating evaluation of an expression by a PE assignment method according to an embodiment of the invention.

FIG. 10 is a time chart for evaluating the value of the expression represented by the tree shown in FIG. 6 for all of "Is" in accordance with the PE assignment method according to the teaching of the present invention incarnated in the instant embodiment. In FIG. 10, time is taken along the ordinate with the PEs being arrayed along the abscissa. More specifically, the PEs are shown along the abscissa in the order from the left-to the right, starting from the PE allocated with the array element whose subscript is of the smallest value. The processings for "Is" are executed in parallel by the individual PEs, respectively. Arrows shown in FIG. 10 represent data transfers among the PEs. In phase 1, the PEs determine products of the elements of the arrays A and B allocated to themselves. This operation corresponds to execution of the operation for the lowermost interior node 3000 of the tree 30 shown in FIG. 6. In phase 2, each PE transfers the value of the product as determined to the right neighbor PE. In phase 3, each PE transfers the value of the element of the array D allocated to itself to the left neighbor PE. In phase 4 et seq., each PE executes operations for the two topmost interior nodes 3001 and 3002 by using the value of the product of A and B transferred from the left neighbor, the value of D transferred from the right neighbor and a value of element of its own array C or E allocated to each PE.

Figure 11:
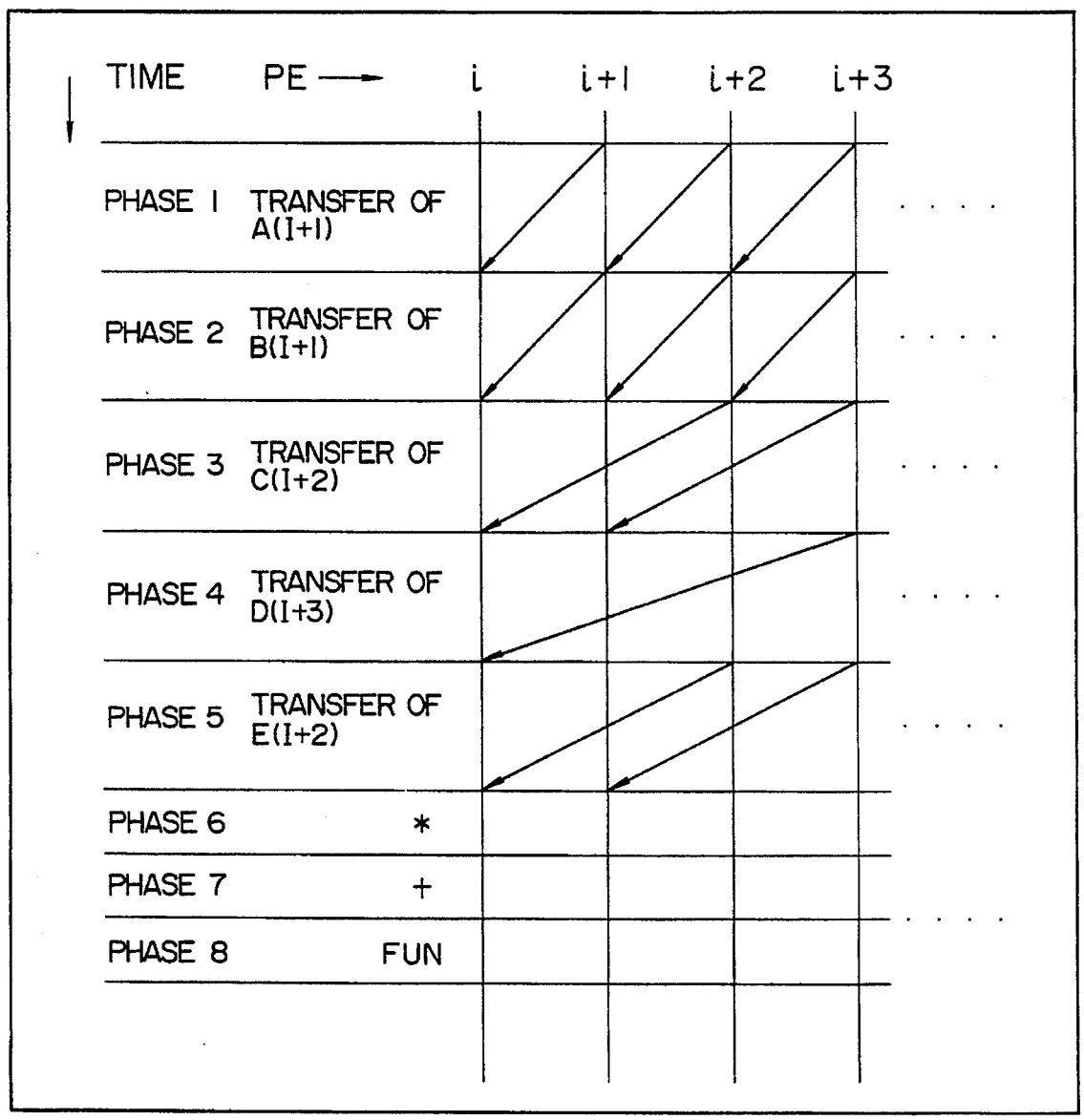
FIG. 11 is a time chart for illustrating evaluation of an expression in accordance with a prior art PE assignment method.

In this conjunction, it is noted that when an expression of concern contains a function having three parameters, the method of assigning the PEs to the operations included in the expression has not heretofore been adopted in view of the number of data transfers as required. Rather, such assignment method has been adopted that all operations are assigned, for example, to the PE(0) regardless of the content of the expression. FIG. 11 is a time chart for evaluating the expression represented by the tree 30 of FIG. 6 in accordance with such assignment as mentioned above. In the phases 1 to 5, values of the elements of the arrays A and B allocated to the individual PEs ape transferred to the respective left neighbor PEs, the values of the arrays C and E are transferred to the second neighbormost left PEs and the value of the element of the array D is transferred to the third neighbormost left PEs. In the phases 6 et seq., operations for the three interior nodes 3000 to 3002 of the tree 30 are executed by the individual PEs by using the values of elements of the arrays A, B, C, D and E transferred from the other PEs, respectively.

Comparison of the inventive method with the conventional one shows that the number of data transfers as involved in executing the operation according to the invention is much smaller, and thus the time taken for executing or realizing the operation as a whole is considerably reduced.

Figure 12:
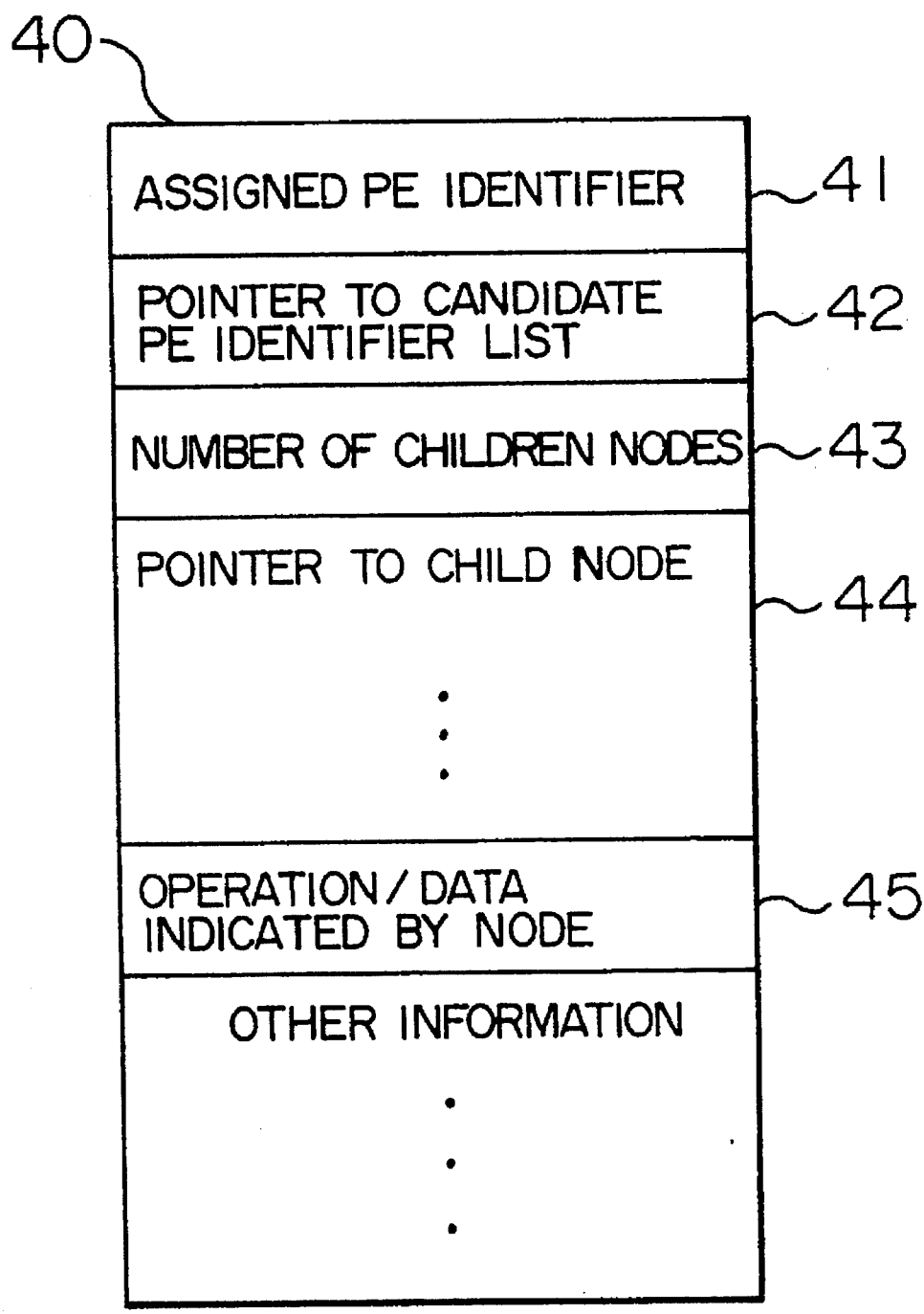
FIG. 12 is a diagram showing a representation of node internally of a computer.

FIG. 12 is a view showing a representation of a tree node internally of the computer upon execution of the assignment method according to the invention. A structure 40 representing a node includes information representing an assigned PE identifier 41, a pointer 42 to a candidate PE identifier list, number of children nodes 43, pointers 44 to the children nodes, operation/data 45 indicated by the node and other information. In the case of the leaf node, the assigned PE identifier 41 represents the identifier of the PE to which the data represented by the leaf is allocated. In the case of the interior node, the assigned PE identifier 41 represents the PE identifier assigned to the interior node as the result of the PE assignment carried out according to the teaching of the invention.

Figure 13:
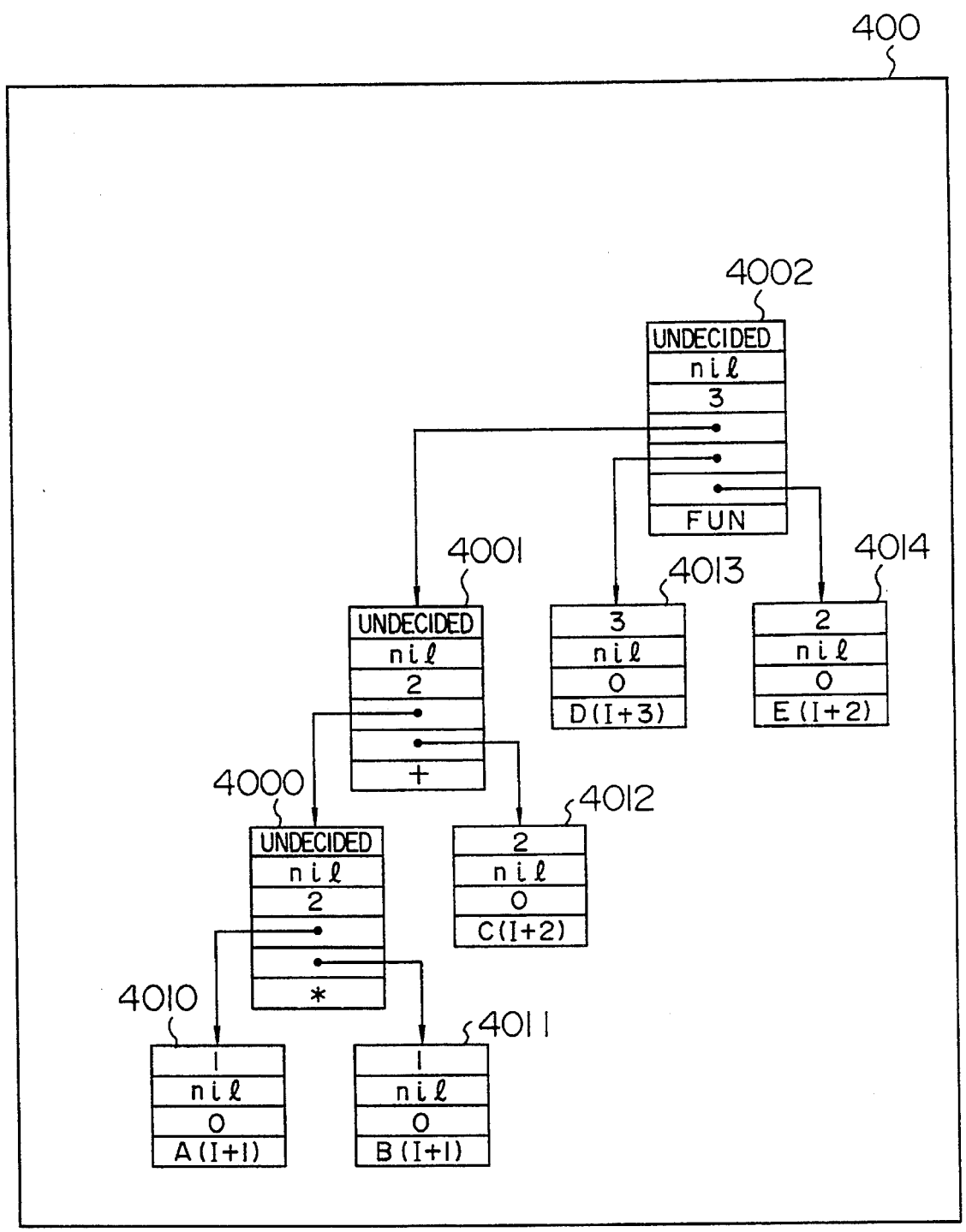
FIG. 13 is a diagram illustrating a representation of a tree internally of the computer.

FIG. 13 shows a tree representation 400 of the tree 30 shown in FIG. 6 internally of the computer. The PE identifiers to be allocated to the interior nodes 4000 to 4002 remain undecided. For each of the interior nodes 4000 to 4002 and the leaf nodes 4010 to 4014, the pointer to the candidate PE identifier list represents a nil pointer.

Figure 14:
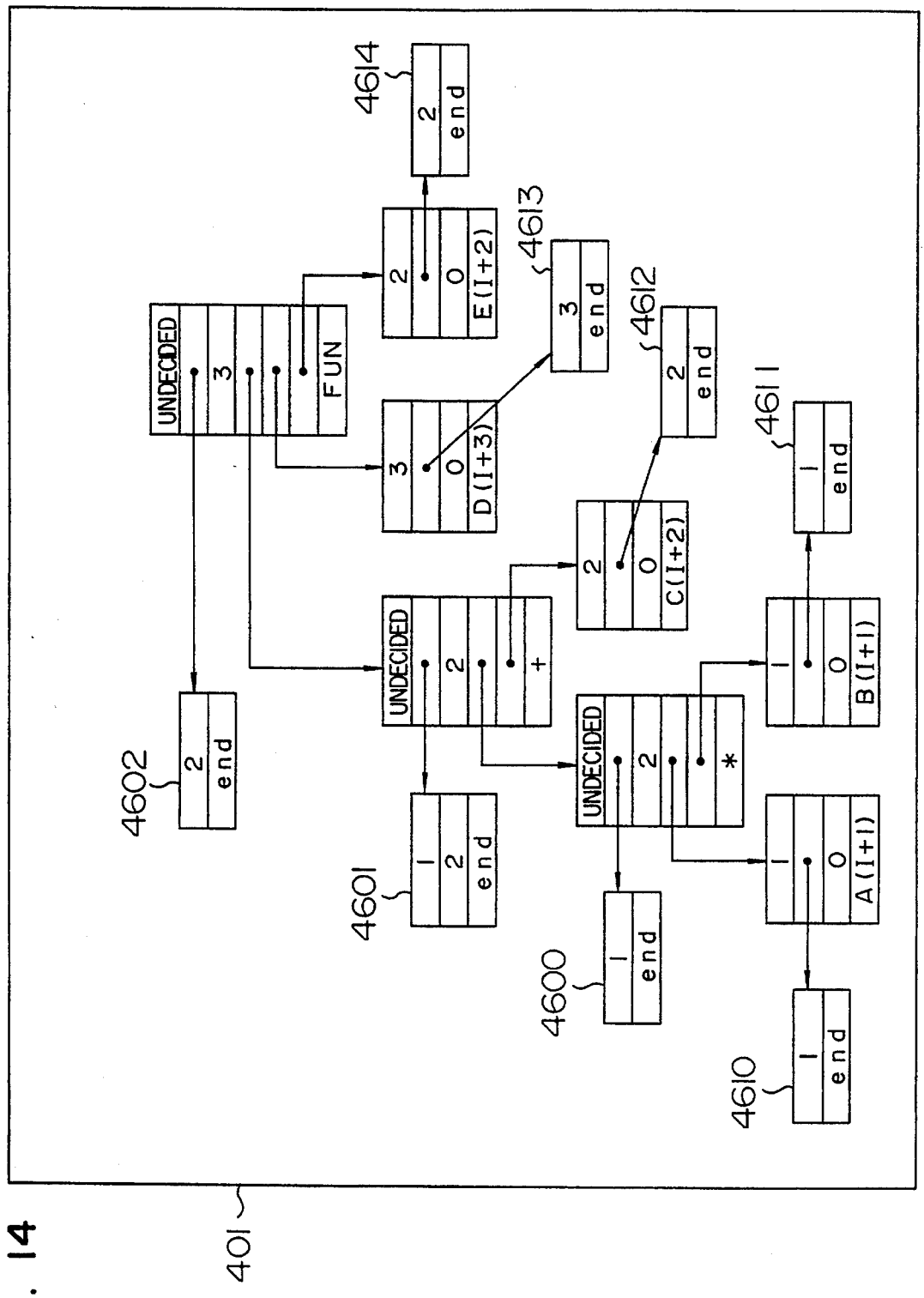
FIG. 14 is a diagram illustrating representation of candidate PEs internally of the computer.

FIG. 14 is a view illustrating a manner in which the candidate PE identifiers are determined for the tree representation 400 shown in FIG. 13. For the interior node 4000 to 4002 as well as the leaf nodes 4010 to 4014, the pointers are set to the candidate PE identifier lists 4600 to 4602 and 4610 to 4614, respectively. The last of the candidate PE identifier list is attached with an end mark. The candidate PE identifiers for individual nodes are determined through the processing described hereinbefore by reference to FIG. 2 and are same as those shown in FIG. 8.

Figure 15:
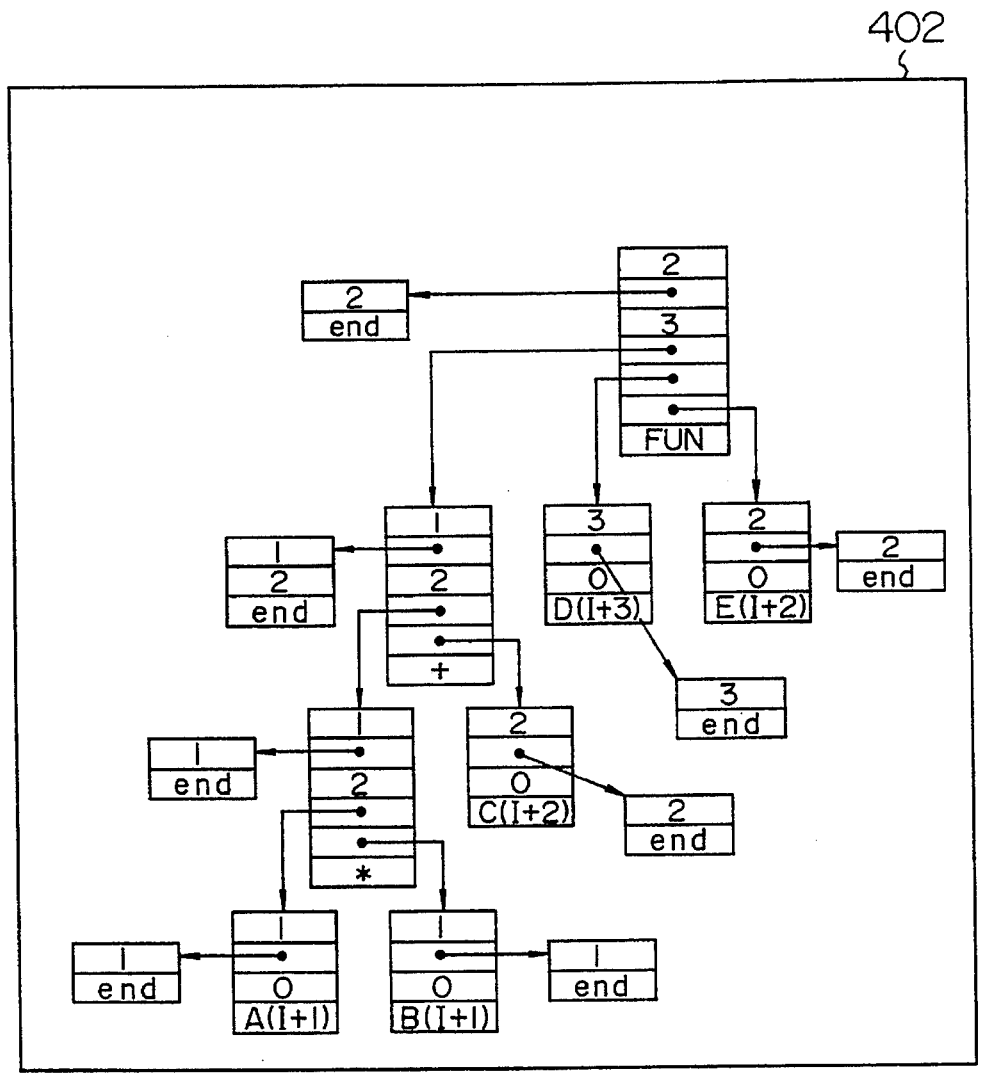
FIG. 15 is a diagram illustrating representation of definitive PEs internally of the computer.

FIG. 15 is a chart illustrating a manner in which the definitive PE identifier of each node is determined through the processing shown in FIG. 3 on the basis of the tree 400 attached with the candidate PE identifiers as shown in FIG. 14. It will be seen that the same definitive PE identifiers as those shown in FIG. 9 are determined for the interior nodes 4000 to 4002, respectively.

Figure 16:
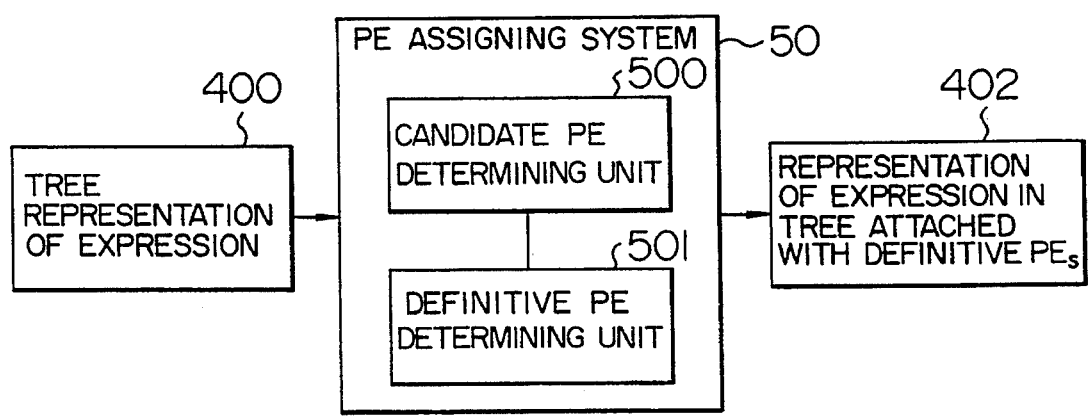
FIG. 16 is a schematic block diagram showing an arrangement of an apparatus for carrying out a PE assignment method.

FIG. 16 is a schematic block diagram showing, by way of example, a system for executing the PE assignment described previously in conjunction with FIG. 1. The PE assigning system generally denoted by 50 comprises a candidate PE determining unit 51 and a definitive PE determining unit 52. The PE assigning system 50 is so arranged as to receive as the input thereto a tree representation 400 of an expression such as that shown in FIG. 13 and output a tree representation 402 of the expression attached with the definitive PE identifiers such as shown in FIG. 15. The candidate PE determining unit 500 is so arranged as to execute the processing step 10 shown in FIG. 1 to thereby determine a set of candidate PEs for each node of the tree. On the other hand, the definitive PE determining unit 52 executes the processing step 11 shown in FIG. 1 to determine the definitive PE identifier for each node of the tree.

In the foregoing description, assignment of a value of an expression as determined to another variable is put aside from consideration. It should however be appreciated that even when such assignment becomes a matter of concern, the PE assignment can be carried out through similar procedure while minimizing the number of the data transfers, examples of which are illustrated in FIGS. 17A, 17B and 17C. More specifically, FIG. 17A shows in the form of a tree an assignment statement mentioned below.

$$A(I)=B(I)+C(I+2)\times D(I+2)$$

Differing from an addition node 3301 and a multiplication node 3302 which can be executed by any one of the PEs by transferring requisite data thereto, the assignment node 3300 can not be executed by any other PE than the one that has the array element A(I) for the assignment. Accordingly, the assignment node 3300 should be regarded as being originally assigned with the PE(0). Under the circumstances, the tree is then so modified as is shown in FIG. 17B. More specifically, the assignment node 3300 is merged with the node 3310 of the array element A(I) to be assigned to thereby create a new node 3314. Further, the node 3314 is defined as a child node of the addition node 3301. Then, the node 3314 is attached with the PE identifier "0" of the assigned PE. Subsequently, the assignment processing shown in FIG. 1 is executed for the modified tree 331. As a result, the addition node 3301 and the multiplication node 3302 are attached with the PE identifiers "0" and "2", respectively. FIG. 17C is a chart showing the modified tree which has the PE identifiers as attached. It should however be noted that the node 3314 resulting from the merge described above by reference to FIG. 17B is split into the assignment node 3300 and the leaf node 3310 in the original form.

Figure 18:
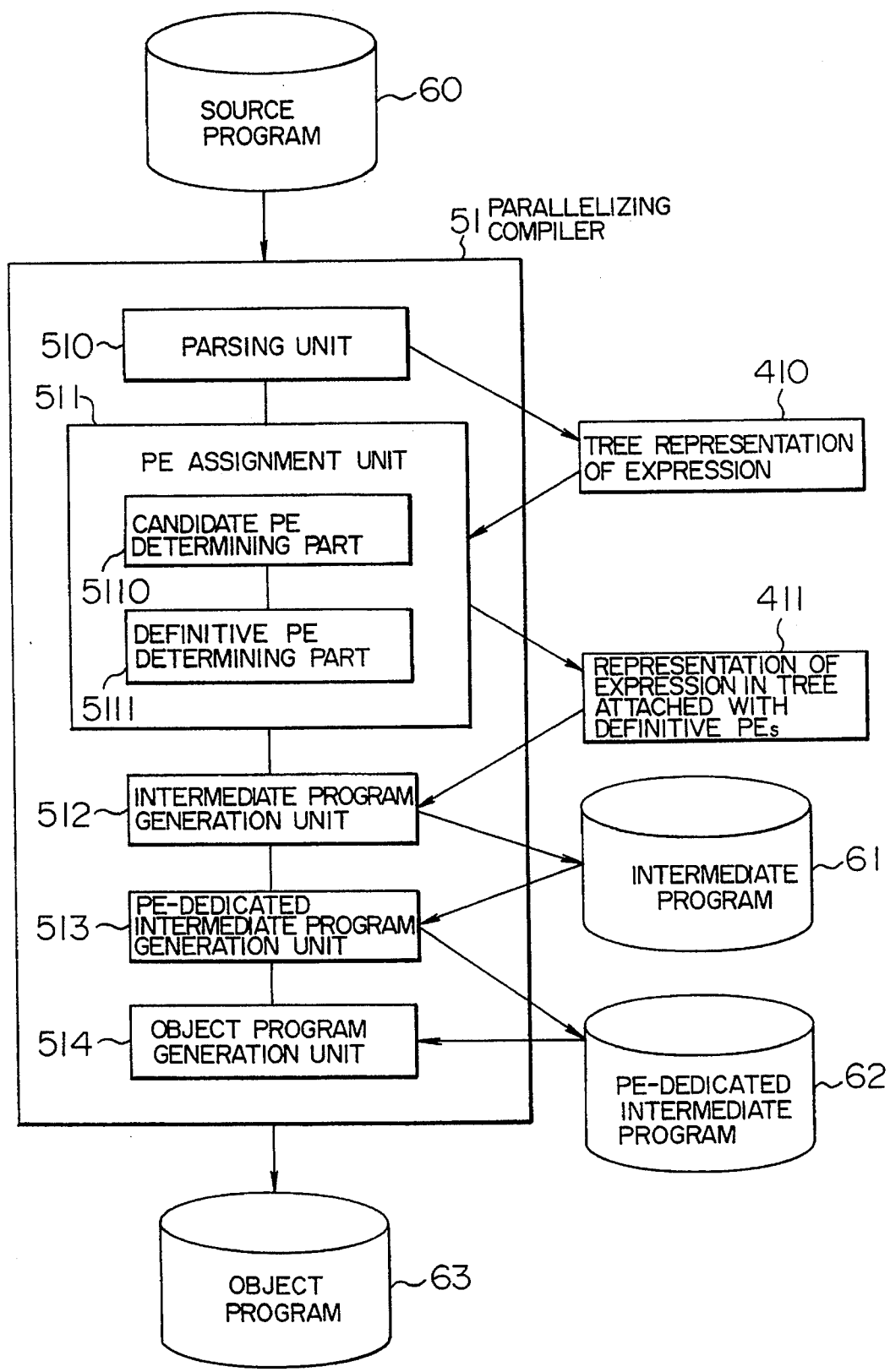
FIG. 18 is a block diagram showing an arrangement of a parallelizing compiler.

FIG. 18 shows an exemplary embodiment of the invention in which the PE assignment method according to the invention is applied to a parallelizing compiler. Referring to this figure, the parallelizing compiler generally denoted by 51 is composed of a parsing unit 510, a PE assigning unit 511, an intermediate program generation unit 512, a PE-dedicated intermediate program generation unit 513 and an object program generation unit 514. The PE assignment unit 511 includes a candidate PE determining part 5110 and a definitive PE determining part 5111. The parallelizing compiler 51 is adapted to be loaded with a source program 60 to thereby output an object program 63 for a parallel computer system. The parsing unit 510 parses the source program and more particularly an expression to translate it to a tree representation 410 of the expression.

The PE assigning unit 511 receives as the input the tree representation 410 to thereby output a tree representation 411 assigned with the definitive PEs. The intermediate program generating unit 512 is supplied as the input with information obtained from the source program to thereby generate an intermediate program 61. More specifically, inputted to the intermediate program generating unit 512 is the tree representation 411 assigned with the definitive PEs, whereby a corresponding intermediate program is generated. The PE-dedicated intermediate program generating unit 513 has the input supplied with the intermediate program 61 to thereby generate a PE-dedicated intermediate program 62. The object program generating unit 514 is loaded with the PE-dedicated intermediate program 62 to generate the object program 63.

The intermediate program 61 is composed of processings described in the source program each of which is additionally affixed with information indicating the PE assignment. The intermediate program may be obtained by dividing the processings included in the source program or alternatively by inserting therein the data transfer processing, as occasion requires. The PE-dedicated intermediate program 62 describes the processings to be executed by the individual PEs, respectively. The following description will be directed to the processings executed by the intermediate program generating unit 512 and the PE-dedicated intermediate program generating unit 513. The processings executed by the object program generation unit 514 will be omitted from the description because there is no novelty to be mentioned when compared with the conventional parallelizing compiler.

Figures 19A, 19B, 19C, 20:
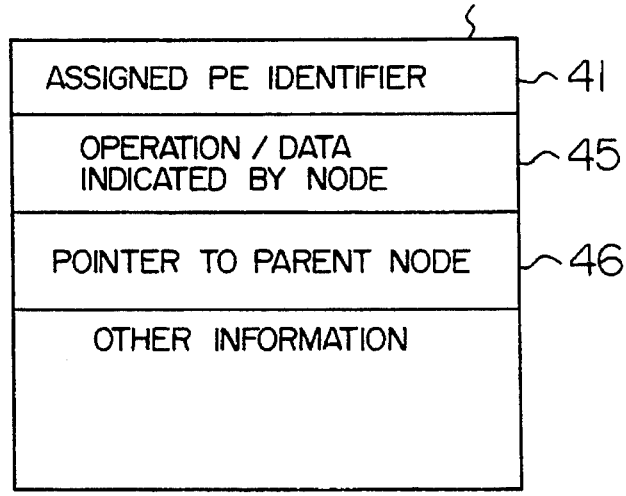
FIGS. 19A, 19B and 19C are diagrams for illustrating examples of program translation.
FIG. 20 is a view for illustrating a tree node representation internally of a computer.

FIGS. 19A, 19B and 19C are views illustrating examples of the program translation performed by the parallelizing compiler 51. More specifically, FIG. 19A shows an example of the source program 600 for translation. FIG. 19B shows an example of an intermediate program 610 resulting from the translation performed in accordance with the PE assignment method of the present invention. In the case of the intermediate program 610, a processing expressed by one assignment statement which is contained in the source program 600 and which is given by $$A(I)=B(I)+C(I+2)\times D(I+2)$$

is divided, whereon the subprocessings resulting from the division are attached with the PE identifiers 6100 to be assigned. In the case of this example, a value of $C(I+2)\times D(I+2)$ is determined by the PE(2) to be subsequently transferred to TMP(I) allocated to PE(0). Parenthetically, "TMP" is a temporary array name generated by the compiler 51. The PE(0) waits for the transfer of TMP(I) from the PE(2). Upon reception of TMP(I), the PE(0) execute an assignment statement given by $$A(I)=B(I)+TMP(I)$$

This intermediate program conforms to the PE assignment illustrated in FIG. 17C.

On the other hand, FIG. 19C shows an intermediate program 611 resulting from the translation realized by resorting to the conventional PE assignment method in which the PE(0) is assigned to all the operations. More specifically, in the case of the intermediate program 611, values of $C(I+2)$ and $D(I+2)$ allocated to the PE(2) are transferred to C'(I) and D'(I) allocated to the PE(0). In this conjunction, "C'" and "D'" represent, respectively, the temporary array names generated by the compiler 51. The PE(0) waits for the transfer of C'(I) and D'(I) from the PE(2) and executes an assignment statement given by $$A(I)=B(I)+C'(I)\times D'(I)$$

It will now be understood that when compared with the intermediate program according to the conventional method illustrated in FIG. 19C, the intermediate program of FIG. 19B according to the assignment method of the present invention can enjoy an improved efficiency in that the number of data transfers is decreased. In the case of the abovementioned example, the number of data transfers is smaller by one than that involved in the conventional method.

Description will now be made of a method for generating the intermediate program 61 from the tree representation 411 of the expression attached with the definitive PEs. FIG. 20 is a chart for illustrating information required for generating the intermediate program which is extracted from the tree node representation internally of the computer system. As can be seen in the figure, the extracted information includes a pointer 46 to the parent node in addition to that shown in FIG. 12. It is assumed that the assigned PE identifier 41 is attached with the definitive PE identifier by the PE assigning unit 511.

Figure 21:
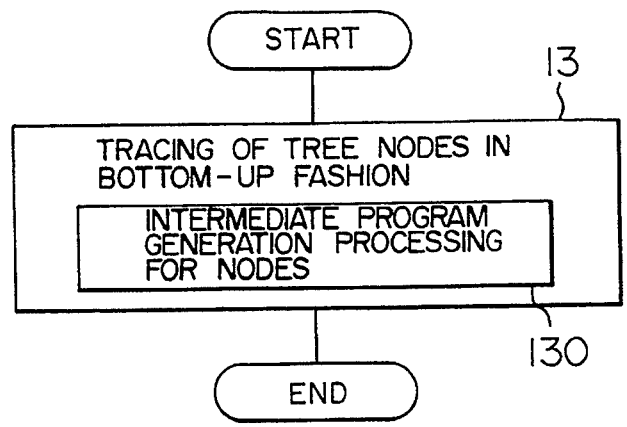
FIG. 21 is a flow chart illustrating an intermediate program generation processing.

FIG. 21 is a flow chart illustrating a processing executed by the intermediate program generation unit 512. In a step 130, the individual nodes of the tree attached with the definitive PE identifiers are traced in a bottom-up fashion, and the intermediate program generation processing is executed at each node in a step 130.

Figure 22:
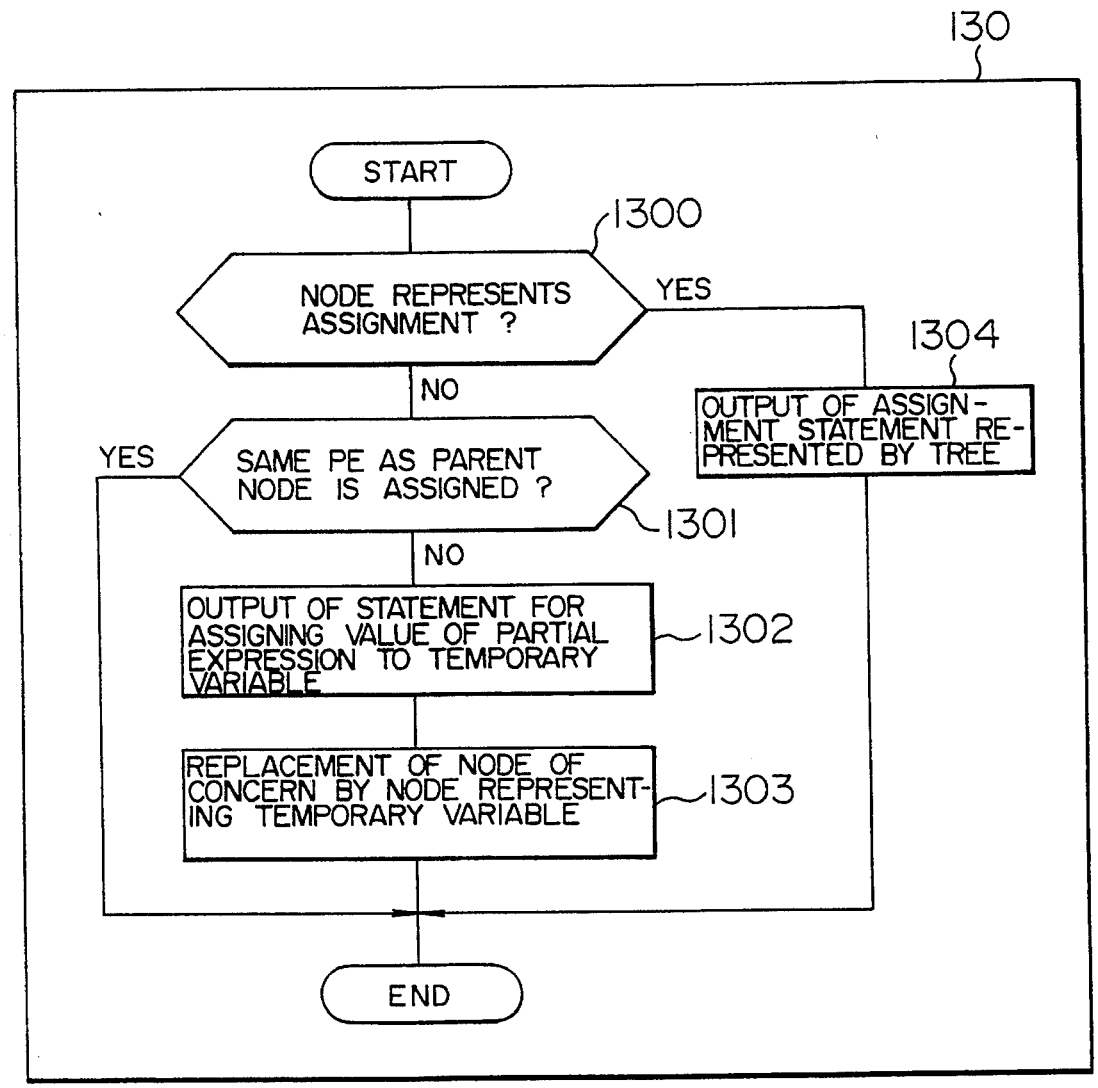
FIG. 22 is a flow chart illustrating details of the intermediate program generation processing at each node.

FIG. 22 is a flow chart illustrating details of the intermediate program generation processing at each of the nodes as executed in the step 130. Referring to the figure, in a step 1300, decision is made as to whether or not the node of concern indicates the assignment. If so (YES), the processing proceeds to a step 1304 and, if otherwise, to a step 1301. In the step 1301, it is decided whether or not the PE identifier 41 allocated to the node of concern is the same as the PE identifier allocated to the parent node. The PE identifier allocated to the parent node can be ascertained by tracing the pointer 46 to that parent node. If it is found that the PE identifier 41 is the same as that of the parent node, nothing is performed for the node of concern, whereupon the processing comes to an end. On the other hand, unless the assigned PE identifier 41 of the node of concern is the same as that of the parent node, the processing proceeds to a step 1302. In the step 1302, a statement where a value of a partial expression rooted in the node of concern is determined and transferred to the PE identified by the PE identifier assigned to the parent node, is outputted to the intermediate program with the statement being attached with the PE identifier assigned to node of concern. A temporary variable to be used as the destination or sink for the data transfer is so generated that the name of that variable is not duplicate with other variables. At this juncture, it should be mentioned that when the node of concern is a leaf node, the partial expression rooted in the leaf node is nothing but the data represented by the very leaf node. In the step 1303, the node of concern is replaced by a leaf node representing the temporary variable to which the transfer is destined. The assigned PE identifier 41 of the node replaced is also altered to the PE identifier of the transfer destination. Thus, the processing for the node of concern comes to an end. In the aforementioned step 1304, the assignment statement of a tree rooted in the node of concern is outputted to the intermediate program with the statement being attached with the PE identifier assigned to the node of concern. In that case, when there exists a temporary variable constituting a sink for the data transfer from other PE, a statement waiting for the data transfer is outputted in the position preceding the abovementioned assignment statement.

Figure 23A:
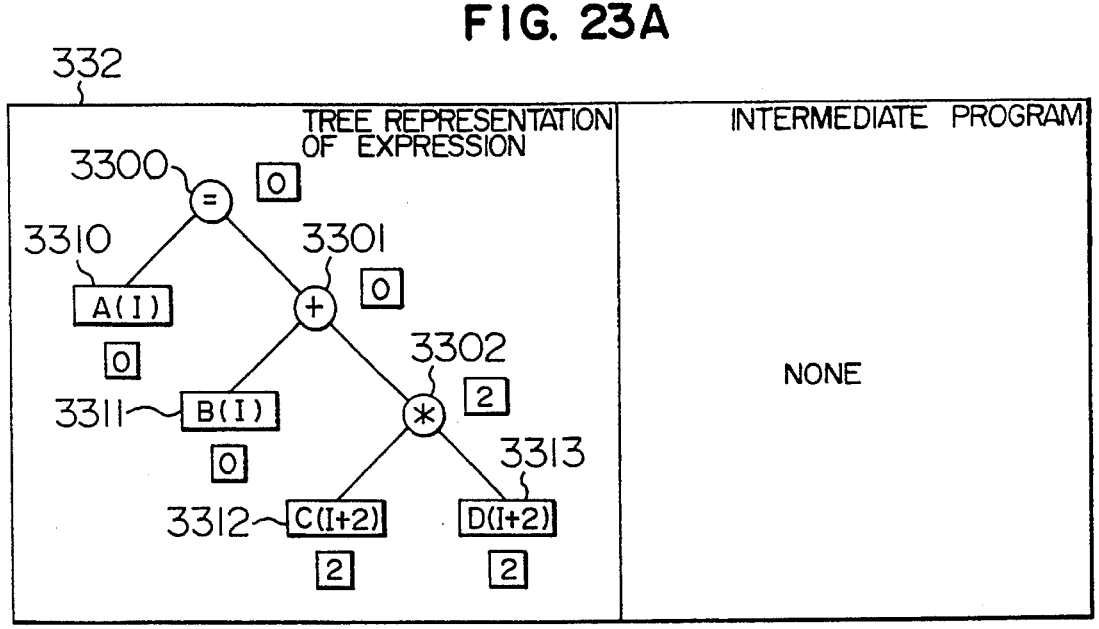
FIGS. 23A, 23B and 23C are diagrams for illustrating a process through which an intermediate program is generated.
Figure 23B:
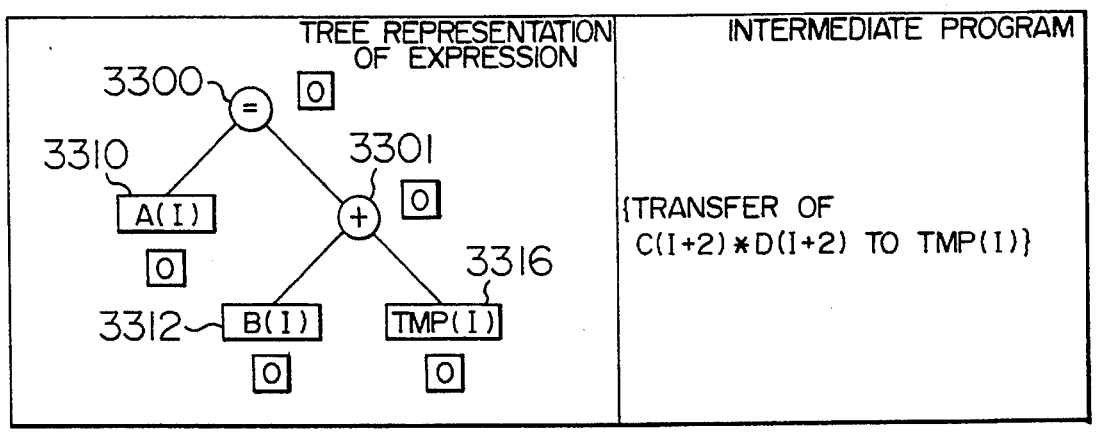
Figure 23C:
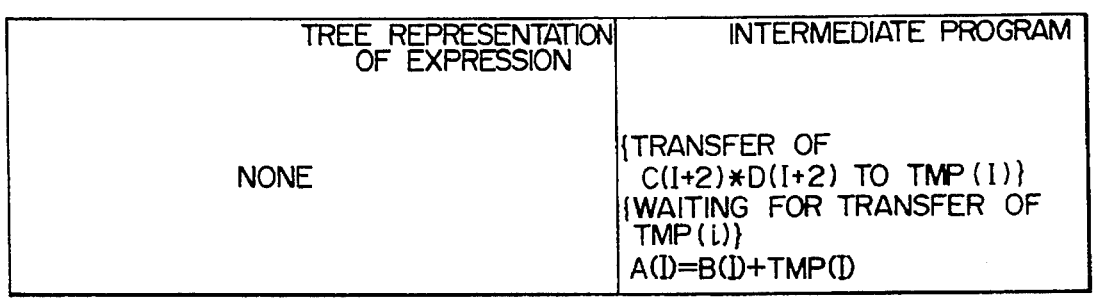

FIGS. 23A, 23B and 23C ape views for illustrating a process through which the intermediate program is generated from a tree affixed with the definitive PE identifiers. More specifically, FIG. 23A is a diagram showing a tree 332 affixed with the definitive PE identifiers and representing an assignment statement contained in the source program illustrated in FIG. 19A. In accordance with the processing step 13 described above by reference to FIG. 21, the tree 332 is traced in a bottom-up fashion. At the leaf nodes 3310 to 3313 which are affixed with the same PE as-that of the parent node, no processing is performed. At a multiplication node 3302 which is assigned with a PE differing from that of the parent node, a statement for transferring-the value of the partial expression C(I+2)×D(I+2) to the temporary variable (I) is outputted to the intermediate program through the processing in the step 1302 described above by reference to FIG. 22, while the node 3302 of concern is replaced by a leaf node 3316 representing the temporary variable TMP(I) through the processing in the step 1303 shown in FIG. 22, as is illustrated in FIG. 23B. At an addition node 3301 which is assigned with a same PE as that of the parent node, no processing is executed. In the case of an assignment node, a statement waiting for transfer of the temporary variable TMP(I) and the assignment statement given by

A(I)=B(I)+TMP(I)

are outputted to the intermediate program through the processing in the step 1304 shown in FIG. 22, as will be seen in FIG. 23C.

FIGS. 24A and 24B are views for illustrating an example of the PE-dedicated intermediate program 62 generated by the PE-dedicated intermediate program generating unit 513 in comparison with a conventional one. The intermediate program 61 represents the whole processing described in the source program 60. In contrast, the PE-dedicated intermediate program 62 represents a processing to be executed by each PE. In the programs illustrated in FIGS. 24A and 24B, a symbol i represents the absolute PE identifier. The PE-dedicated intermediate program 620 shown in FIG. 24A is generated from the intermediate program 610 shown in FIG. 19B according to the method of the invention. In case the absolute PE identifier i of a PE of concern ranges from 3 to 1024 inclusive, a value of c(i)×d(i) calculated from the data allocated to the PE of concern is transferred to the data TMP(i−2) allocated to a PE assigned with an absolute PE identifier which is smaller by "2" than that of the PE of concern. Subsequently, when the absolute PE identifier of a PE of concern is in a range of 1 to 1022, the PE of concern waits for transfer of data from a PE having the absolute PE identifier smaller by "2" than the PE of concern to the array TMP(i) allocated thereto, wherein upon reception of the data as transferred, an assignment statement of A(i)=B(i)+ TMP(i) is executed. FIG. 24B shows a PE-dedicated intermediate program 621 generated from the intermediate program 611 according to a prior art method. Comparison of the intermediate program generated according to the invention with the prior art shows that the latter requires the number of data transfers which is greater by one than the PE-dedicated intermediate program 620 according to the present invention.

Figure 25A:
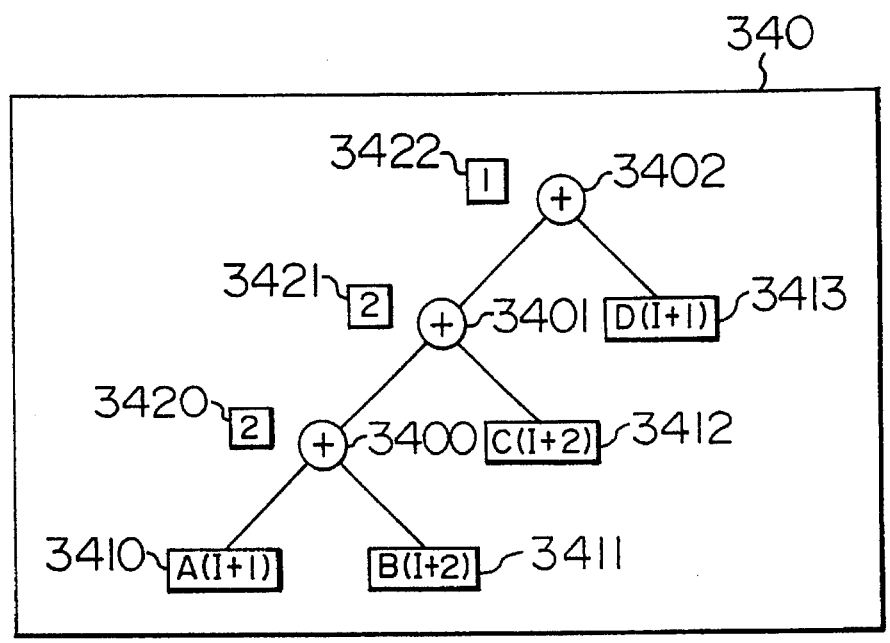
FIGS. 25A and 25B are diagrams for illustrating examples of application of the commutative/associative laws.

Now, another embodiment of the invention will be described in conjunction with the method of decreasing the number of data transfers by making use of the commutative law and the associative law of operation which apply valid to addition and multiplication. FIG. 25A shows a tree representation 340 of an expression mentioned below:

A(I+1)+B(I+2)+C(I+2)+D(I+1)

Figure 25B:
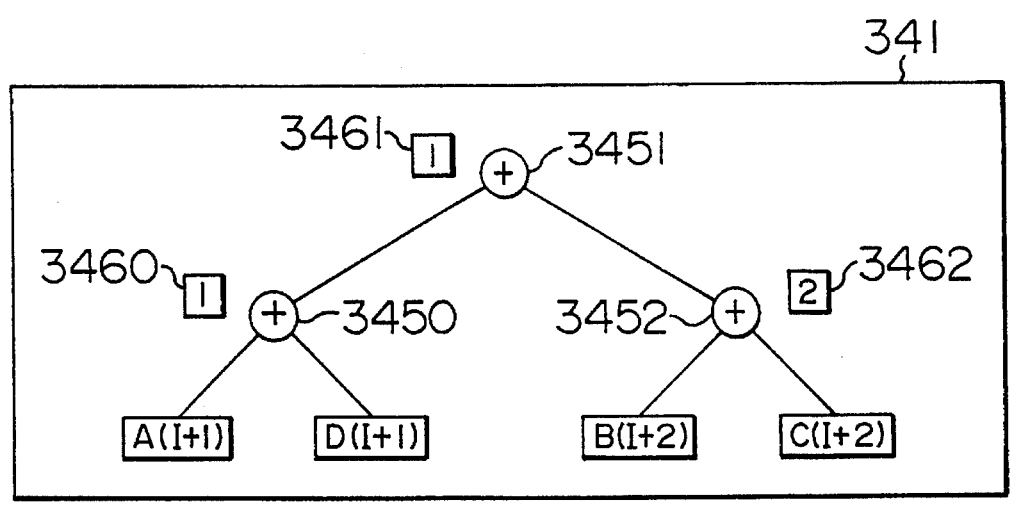

As can be seen in the figure, the interior nodes 3400 to 3402 are attached with definitive PE identifiers 3420 to 3422, respectively, in accordance with the method described hereinbefore by reference to FIG. 1. According to the illustrated PE assignment method, the number of data transfers as required is "2" (twice data transfers). When the order of additions involved in the execution of the abovementioned expression is permutated to thereby modify the expression as follows:

(A(I+1)+D(I+1))+((B(I+2)+C(I+2))

the tree 341 representing the modified expression will be of such a structure as shown in FIG. 25B. The assignment of the PEs indicated by the definitive PE identifiers 3460 to 3462 to the tree 341 can reduce the number of data transfers to one which is obviously smaller by one than the PE assignment to the original expression for which the order of operations is not permutated.

In the following, a method of assigning the PEs to the individual interior nodes by modifying the tree according to an embodiment of the invention will be described on the condition that the order or sequence of operations may be altered or permutated by making use of the commutative/ associative laws. For simplification of the description, it is assumed that the operation includes only addition and multiplication.

Figure 26:
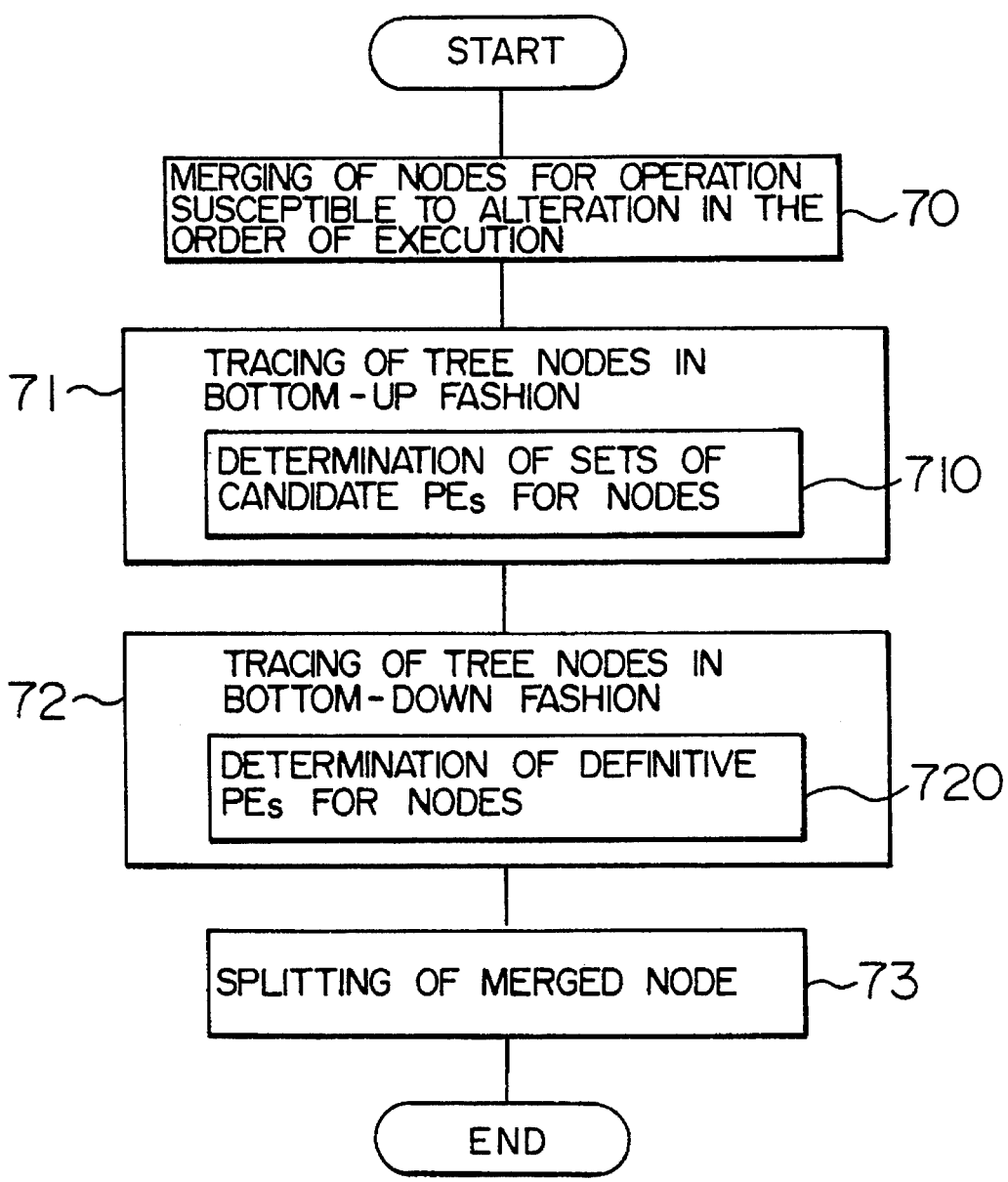
Figure 27A:
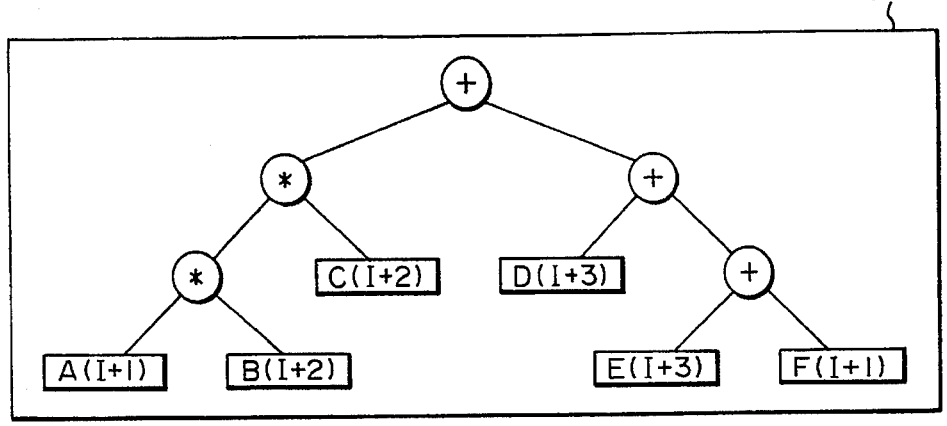
FIGS. 27A and 27B are diagrams showing examples of node merging.
Figure 27B:
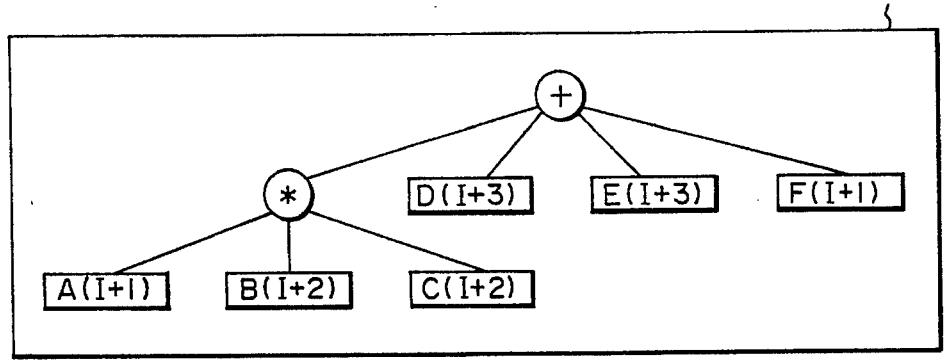

FIG. 26 is a flow chart for illustrating a PE assignment processing according to the instant embodiment of the present invention. Referring to the figure, in a step 70, nodes for which order of execution of the operation is permutable ape merged together to one node. More specifically, when nodes bearing a parental (parent-child) relation represent addition only or multiplication only, these nodes ape merged together to one node. FIGS. 27A and 27B show example of such merging of the nodes. More specifically, node merging of the tree 340 shown in FIG. 27A results in a tree representation 341 shown in FIG. 27B. In a step 71 of FIG. 26, nodes of the tree is traced in a bottom-up fashion to determine a set of candidate PE identifiers for each node. In a step 72, nodes of the tree are traced in a top-down fashion to determine a definitive PE identifier for each of the node. In a step 73, the merged nodes ape split to allow only two children for each mode. Those nodes newly generated by the node splitting ape affixed with appropriate definitive PE identifiers, respectively. The following description will be directed to details of the method for determining the candidate PE identifier, the definitive PE identifiers and the node splitting in this order.

Figure 28:
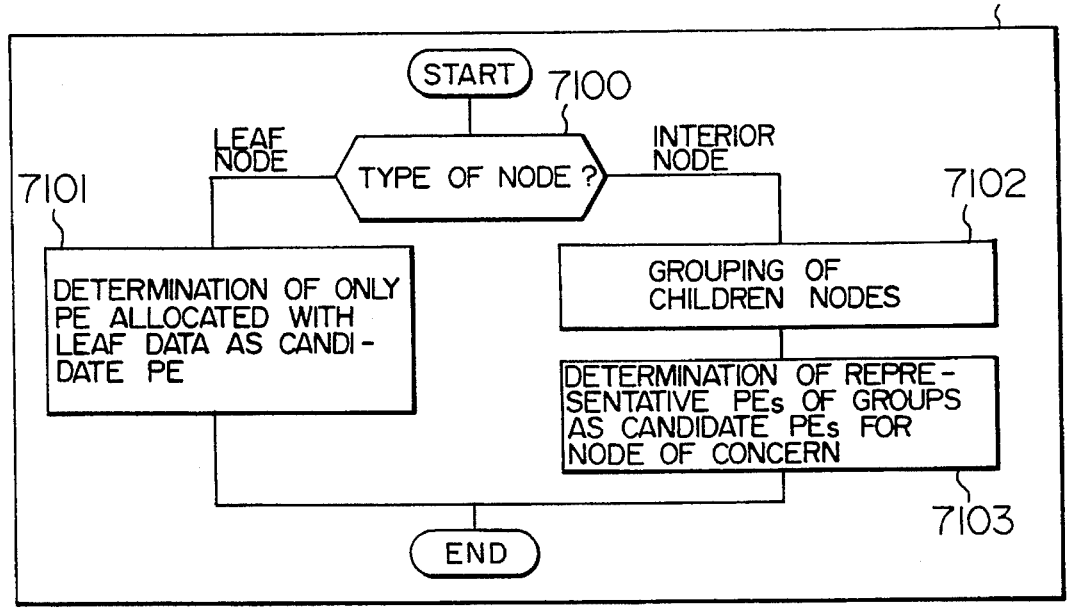
FIG. 28 is a flow chart for illustrating a processing for determining a set of candidate PEs.

FIG. 28 is a flow chart for illustrating in detail the processing for determining a set of the candidate PE identifiers as carried out in the abovementioned step 710. Referring to the figure, in a step 7100, decision is made as to whether the node of concern is a leaf or an interior node. When it is a leaf, the processing proceeds to a step 7101 while proceeding to a step 7102 when it is an interior node. In the step 7101, only the PE identifier of one PE to which the data represented by the leaf has originally been allocated is determined as the candidate PE identifier. On the other hand, in the step 7102, the candidate PE identifiers for children of the node of concern are checked to thereby decompose or classify the children nodes into groups in such a manner that the condition "there exists in each group a candidate PE identifier which is in common to all the children nodes included in the group" (referred to Condition 1) is satisfied and that the number of the groups is minimum. In this connection, the candidate PE identifier which is common to all the children nodes included in a group will be referred to as "representative PE identifier". It is to be noted that there may exist two or more representative PE identifiers in one group. After the decomposition or classification into the groups, all the representative PE identifiers of the groups are determined as the candidate PE identifiers for the node of concern in a step 1703. In case there exist two or more classifications which allow the number of groups to be minimum, the representative PE identifiers of the groups resulting from all the possible classifications are determined as the candidate PE identifiers for the node of concern.

Figure 29A:
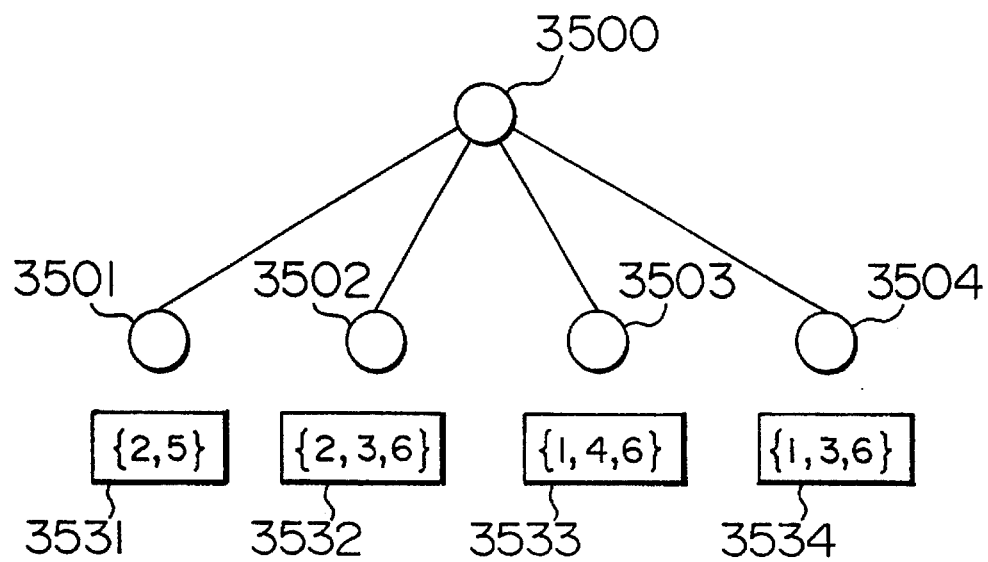
FIGS. 29A and 29B are diagrams for illustrating examples of node grouping or classification.

By way of example, let's consider the groupwise classification or decomposition and the determination of the candidate PE identifiers for an interior node 3500 shown in FIG. 29A. The interior node 3500 of concern has four children nodes 3501 to 3504 which are attached with the candidate PE identifiers {2, 5}, {2, 3, 6}, {1, 4, 6} and {1, 3, 6 }, as indicated at 3531 to 3534, respectively. There are two different groupwise classifications which can meet Condition 1 mentioned above and result in a minimum number of groups. They are

|   | | Classification A: |
|---|---|---|
| Group a: | 3501, 3502 | (representative PE identifier: "2") |
| Group b: | 3503, 3504 | (representative PE identifiers: "1", "6") |
|  |  | Classification B: |
| Group c: | 3501 | (representative PE identifiers: "2", "5") |
| Group d: | 3502, 3503, 3504 | (representative PE identifier: "6") |

In this case, a set of all the representative PE identifiers, i.e. {1, 2, 5, 6} are regarded as the candidate PE identifiers for the interior node 3500.

Figure 30:
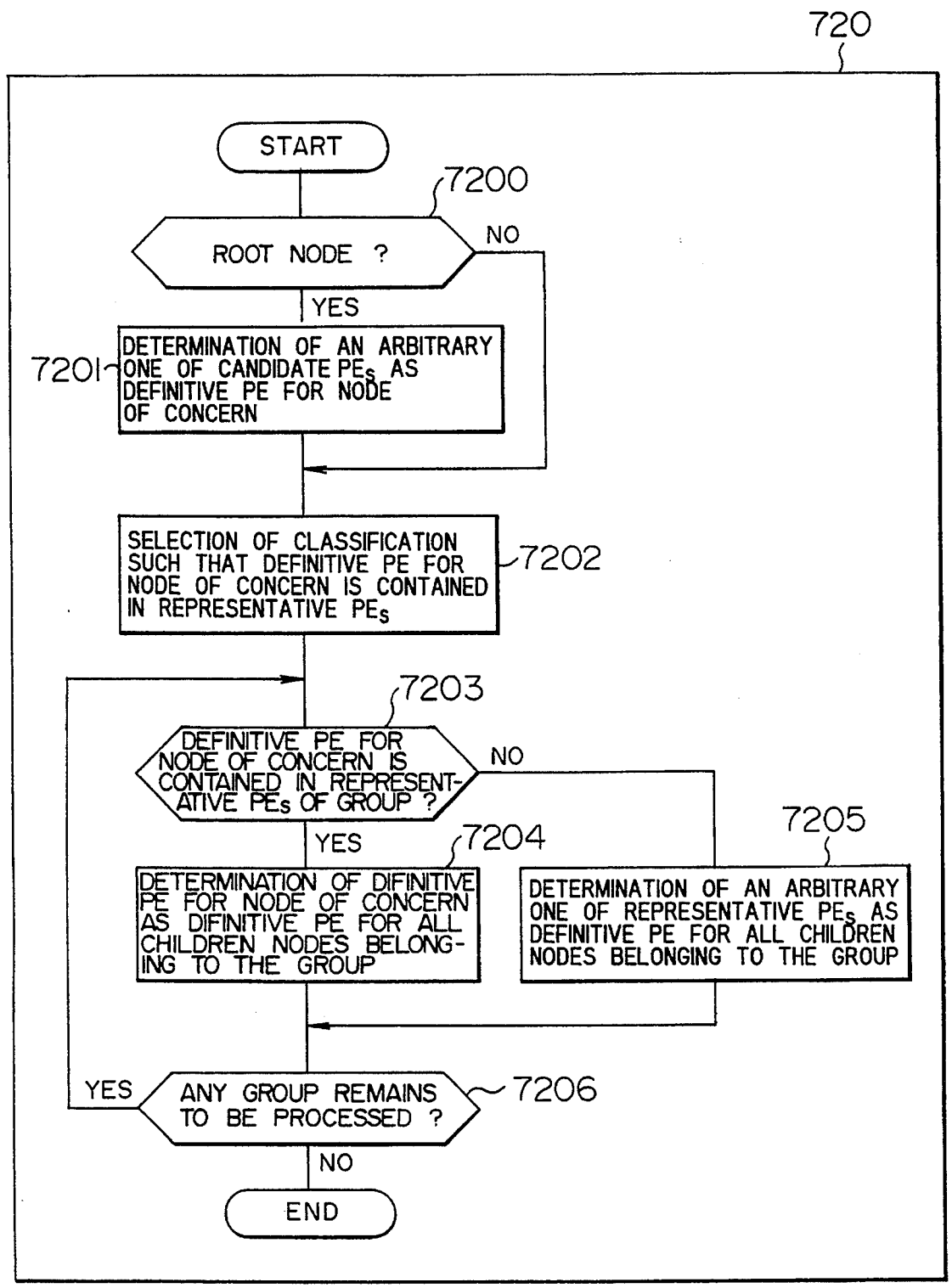
FIG. 30 is a flow chart illustrating a processing for determining definitive PEs.

FIG. 30 is a flow chart illustrating in detail the processing for determining the definitive PE identifier in the step 720 shown in FIG. 26. Referring to to FIG. 30, in a step 7200, decision is made as to whether or not the node of concern is a root node. If so, the processing proceeds to a step 7201 and otherwise skips to a step 7202. In the step 7201, one of the candidate PE identifiers for the root node is arbitrarily selected and regarded to be the definitive PE identifier for the root node. In the step 7202, there is selected arbitrarily from the groupwise classifications of the children nodes such one classification that the definitive PE identifier for the node of concern is included in the representative PE identifiers of any one of the groups resulting from the classification. Subsequently, processing steps 7203 to 7206 are iterated for each of the groups resulting from the classification. More specifically, in the step 7203, it is decided whether or not the definitive PE identifier for the node of concern exists among the representative PE identifiers of the group. When it exists, the processing proceeds to the step 7204 and otherwise to the step 7205. In the step 7204, the definitive PE identifier for the node of concern is determined to be the definitive PE identifier for all the children nodes belonging to the same group as the former. On the other hand, in the step 7205, an arbitrary one of the representative PE identifiers of the group is selected and determined to be the definitive PE identifier for all the children nodes belonging to that group. In the step 7206, decision is made as to whether there remains any group to be processed. If it exists, the processings of the steps 7203 et seq. are performed for that group. Otherwise, the processing routine under consideration comes to an end.

Figure 29B:
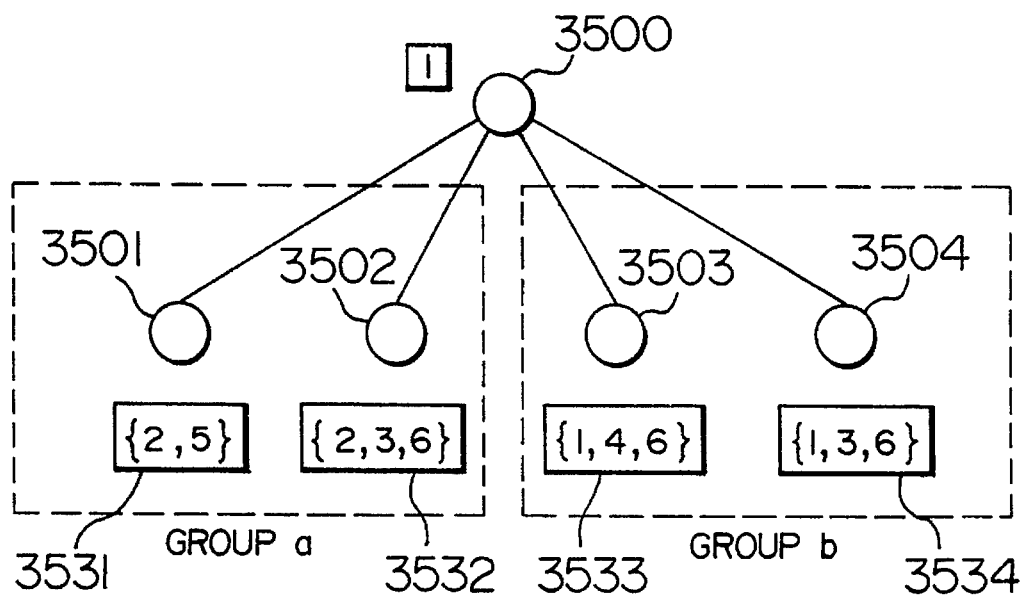

By way of example, let's consider determination of the definitive PE identifiers for the children nodes 3501 to 3504 of the interior node 3500 shown in FIG. 29B when the definitive PE identifier thereof is determined to be "1". There are two different classifications A and B for the children nodes 3501 to 3504, as previously described by reference to FIG. 29A. Such classification which results in that the definitive PE identifier "1" for the interior node 3500 is included in the set of the representative PE identifiers is the aforementioned classification A. In this groupwise classification A, the representative PE identifier of the group a is "2". Accordingly, the definitive PE identifiers for the children nodes 3501 and 3502 are determined to be "2". The group b has two representative identifiers "1" and "6". However, the definitive PE identifier for the node 3500 is "1". Accordingly, for the children nodes 3503 and 3504, the definitive PE identifier is determined to be "1".

Figure 31:
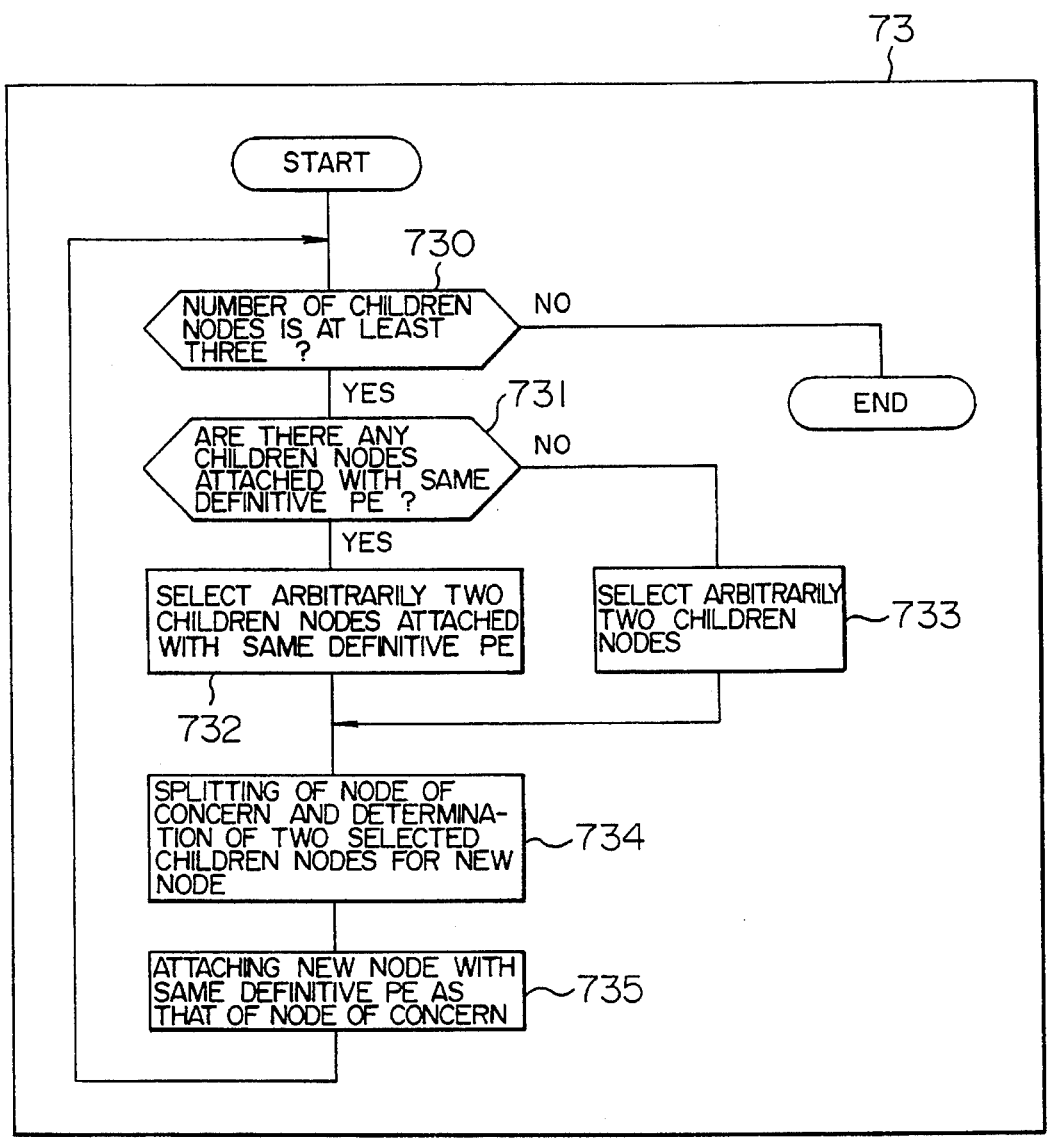
FIG. 31 is a flow chart for illustrating a node splitting processing.

FIG. 31 is a flow chart illustrating in detail the node splitting processing in the step 73 of FIG. 26, where the processing illustrated in this flow chart is performed for each node of the tree attached with the definitive PE identifier. More specifically, referring to FIG. 31, decision is made in a step 730 as to whether or not the number of children nodes is more than three at least. If so, the processing proceeds to a step 731, and otherwise, the processing comes to an end. In the step 731, it is decided whether there exist those children nodes which are attached with a same definitive PE identifier. When the result of this decision step 731 is affirmative (YES), the processing proceeds to a step 732 and otherwise to a step 733. In the step 732, two of the children nodes attached with the same definitive PE identifiers are arbitrarily selected, while in the step 733, two children nodes are arbitrarily selected. In a step 734, a new node representing same operation as the node of concern is generated and determined to be a child of the node of concern, while the two children nodes selected in the steps 732 or 733 are determined to be the children of the newly generated node and deleted from the children of the node of concern. In a step 735, the new node generated at the step 734 is attached with the same definitive PE identifier as that of the node of concern. Subsequently, the step 730 is resumed, being followed by iteration of the processing starting from the step 730 until the number of the children nodes becomes smaller than three.

Figure 32A:
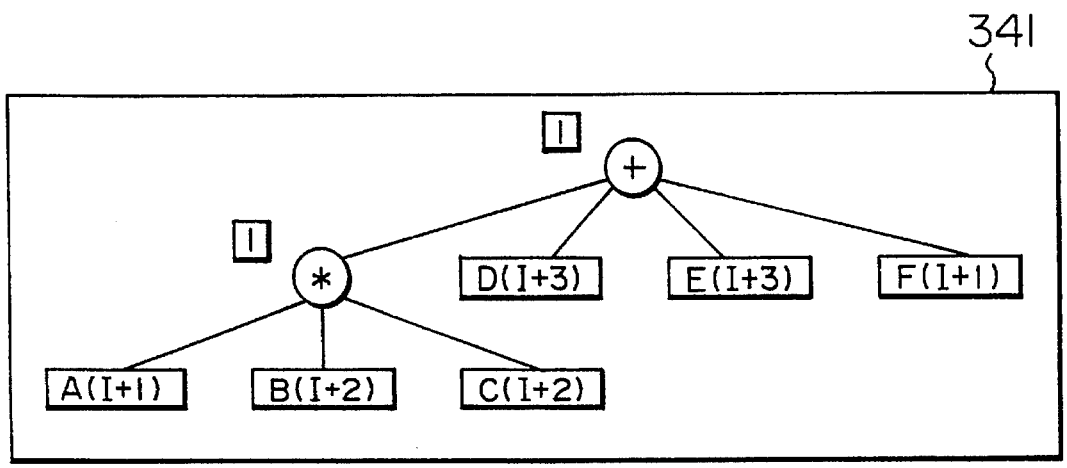
FIGS. 32A and 32B are diagrams showing examples of node splitting processing.
Figure 32B:
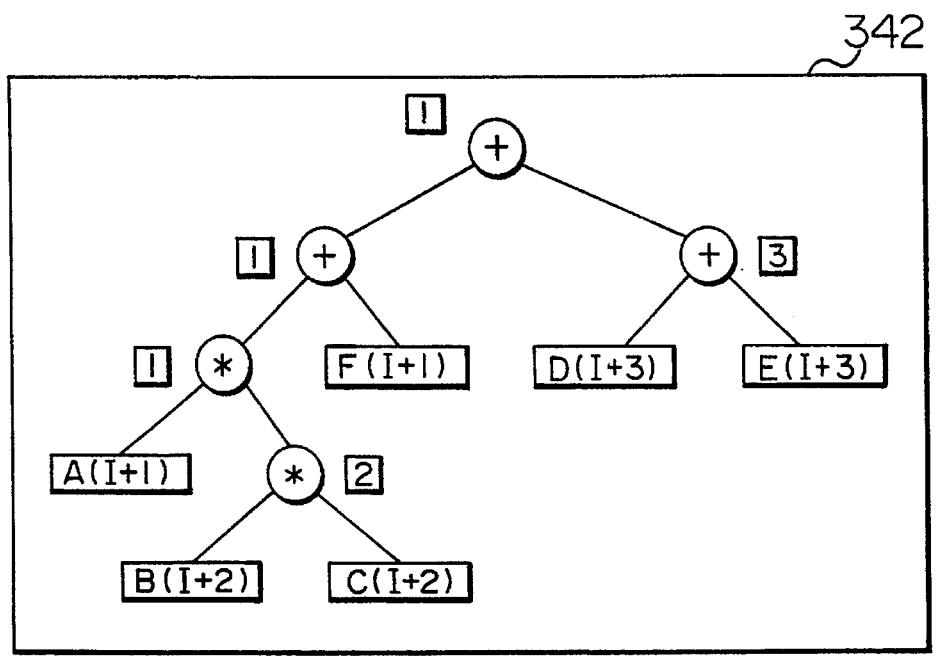

FIG. 32A and 32B show examples of the node splitting processing. FIG. 32A illustrates allocation of the definitive PE identifiers to the tree 341 shown in FIG. 27B in accordance with the processing steps 71 and 72 shown in FIG. 26. The node splitting performed for the individual nodes of this tree 341 through the processing shown in the flow chart of FIG. 31 results in a tree representation 342 shown in FIG. 32B.

Now, a further embodiment of the present invention will be described which is directed to an arrangement for minimizing the number of data transfers throughout a plurality of statements. This can be achieved by eliminating the variables used temporarily in precedence to the PE assignment processing shown in FIG. 1 and performing a processing for assembling a plurality of expressions appearing in the plurality of statements into one expression. By way of example only, let's consider the following two statements in a DO loop.

$$TMP(I)=A(I+1) \times B(I+1)+C(I+2)$$

$$Q(I)=FUN(TMP(I), D(I+3), E(I+2))$$

Figure 33A:
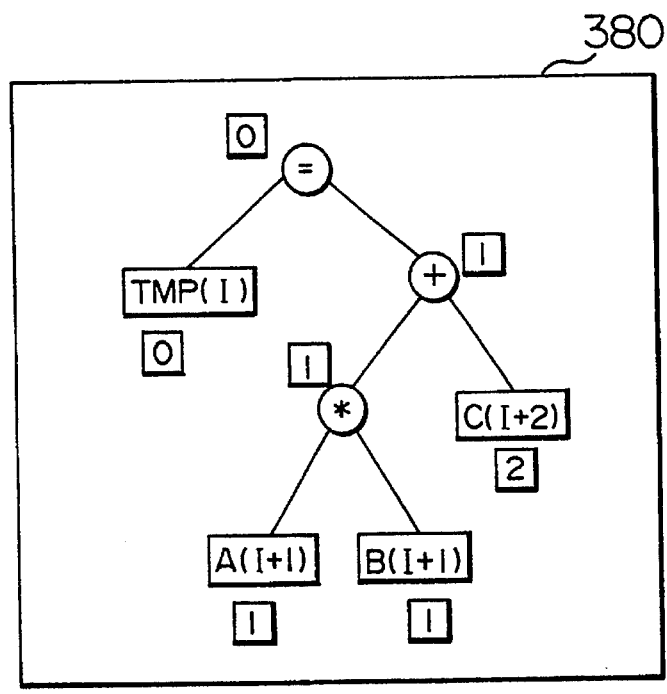
FIGS. 33A and 33B are diagrams for illustrating manners in which a method according to the invention is applied individually to each statement of an expression covering two statements.
Figure 33B:
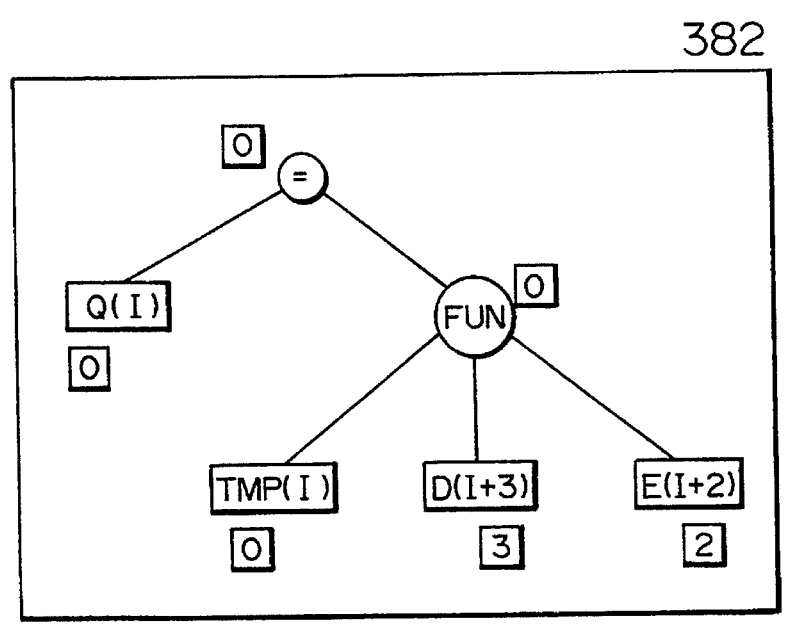

FIGS. 33A and 33B show trees 380 and 382 representing the above statements, respectively. It will be seen that each node is attached with the definitive PE identifier allocated in accordance with the method described hereinbefore in conjunction with FIG. 1 which is applied individually to each statement. In this case, the number of data transfers as involved is four. However, if the value of TMP(I) is not used later on, this variable TMP(I) may be deleted to thereby integrate the two statements mentioned above into one statement which reads as follow:

Q(I)=FUN((A(I+1)×B(I+1)+C(I+2)),

D(I+3), E(I+2))

Whether the value of TMP(i) is to be used later on can be checked through a data flow analysis such as adopted in the conventional compiler. The expression at the left side of the above statement is represented by the tree 30 shown in FIG. 6. Consequently, through the PE assignment according to the method illustrated in FIG. 1, the number of data transfers required for executing the above statement, inclusive of the assignment to Q(I) as well, is three. This means that the number of data transfers is decreased by one owing to deletion of the variable TMP(I) used only temporarily.

Figure 34A:
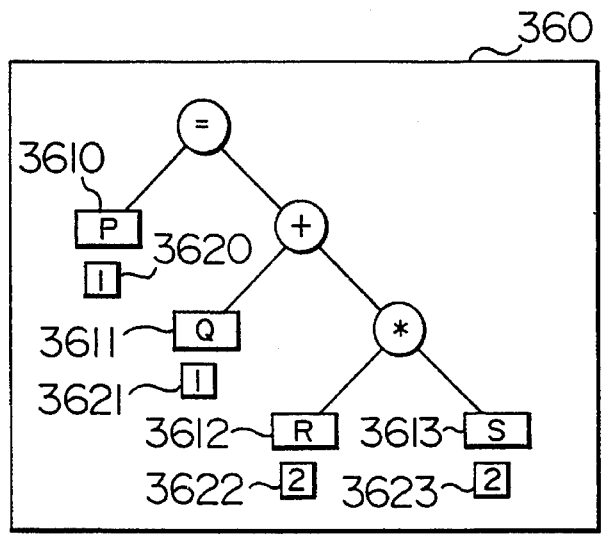
FIGS. 34A and 34B are diagrams showing examples of PE assignment to scalar variables.

Yet another embodiment of the invention will be described in conjunction with a case where data constituting an expression are scalar variables. In the foregoing, it has been assumed that the data constituting the expression are array elements. It should however be appreciated that the PE assignment method according to the invention can equally be applied to the expression whose data are scalar variables. FIG. 34A is a diagram showing a tree 360 representing the following assignment statement:

P=Q+R×S

Figure 34B:
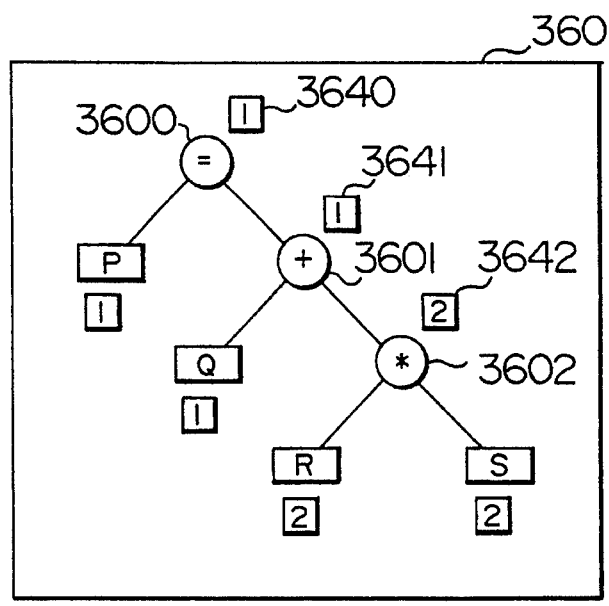

It is assumed that the scalar variables P and Q are allocated to the PE having the absolute PE identifier with R and S being allocated to the PE having the absolute PE identifier "2". In the case where the data are array elements, the PE is discriminatively identified by using the relative PE identifier of the PE allocated with A(I). In the case of the instant embodiment, the PE is to be identified by using the absolute PE identifier. Referring to FIG. 34A, the leaf nodes 3610 to 3613 of the tree shown in the figure are affixed with the absolute PE identifiers 3620 to 3623 of the PEs allocated with the data represented by the associated leaf nodes, respectively. FIG. 34B is a diagram for illustrating determination of the definitive PE identifiers 3640 to 3642 for the interior nodes 3600 to 3602 of the tree shown in FIG. 34A in accordance with the method described hereinbefore in conjunction with FIGS. 17A, and 17C. With the PE assignment determined in this manner, the assignment statement mentioned above can be realized with a single data transfer.

Figure 35:
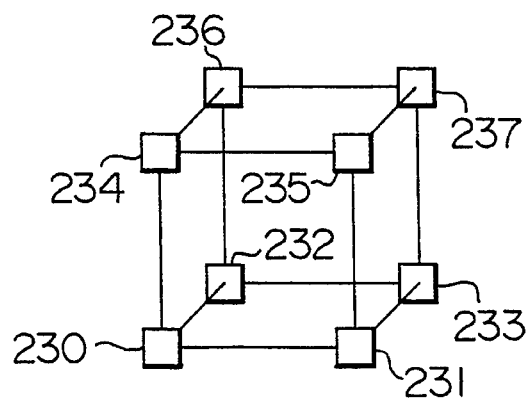
FIG. 35 is a diagram showing PEs interconnected in a cubic form.

Next, description will be directed to the PE assigning method according to still another embodiment of the invention which is so arranged as to minimize the transfer time taken for evaluation of the expression even when the time required for data transfer among the PEs is not constant. In the case of the embodiments of the invention described so far, consideration is paid only to the number of data transfers. In this conjunction, it is however noted that the time taken for the data transfer may become different in dependence on the PEs between which the transfer is to be performed even for the identical data to be transferred. By way of example, in case eight PEs 230 to 237 are interconnected in a cubic configuration, as shown in FIG. 35, it is considered that the data transfer between two PEs located in a diametrical opposition to each other takes thrice as long time as the data transfer between two neighbor PEs. At this juncture, it should be mentioned that the method according to the instant embodiment can equally be applied to other quantity than the time so long as it is involved in the data transfer. Accordingly, this quantity will hereinafter be referred to as "transfer cost" in a more general sense.

Now, description will be turned to the PE assignment according to the instant embodiment on the assumption that the transfer cost between two given PEs is previously given and represented by TC(i, j) , where i and j represent the absolute PE identifiers of the source and destination PEs, respectively. It is presumed that the transfer cost TC(i, j) assumes an integral value. When the definitive PE identifiers are attached to a tree representation, the cost TC(i, j) taken for each branch or link of the tree depends on the definitive PEs at both ends of the link. A sum of the costs for all the links represents the cost required for the evaluation of the value of the expression. Accordingly, what is to be concerned is to attach the definitive PE identifiers to the individual nodes so that the sum of the costs for all the links becomes minimum when a tree having the absolute PE identifiers attached only to the leaves is given.

Figure 37A:
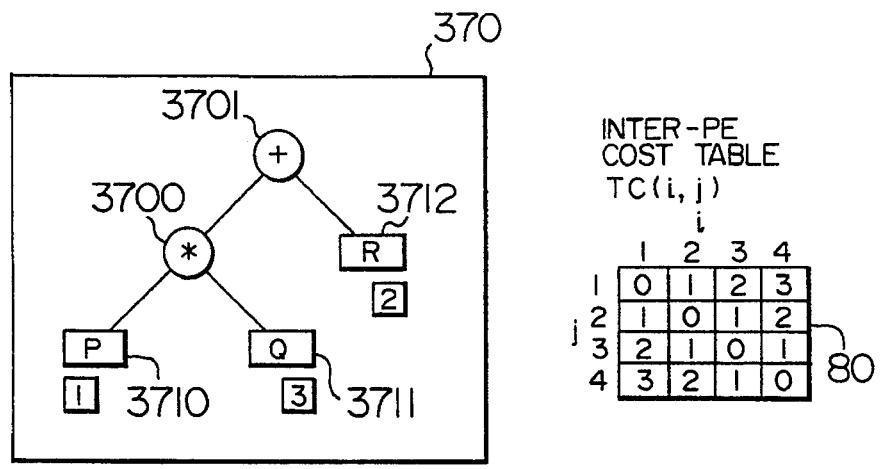
FIGS. 37A, 37B and 37C are diagrams illustrating the PE assignment processing considering the transfer cost.

FIG. 37A shows a tree representation 370 of the following expression:

P×Q+R together with an inter-PE cost table 80 on the assumption that the scalar variables P, Q and R are allocated to the PEs having the absolute PE identifiers "1", "3" and "2", respectively. In the inter-PE cost table 80, there are listed values of the cost TC(i, j) for all combinations of the absolute PE identifiers i and j, presuming that the number of the PEs is four.

Figure 36:
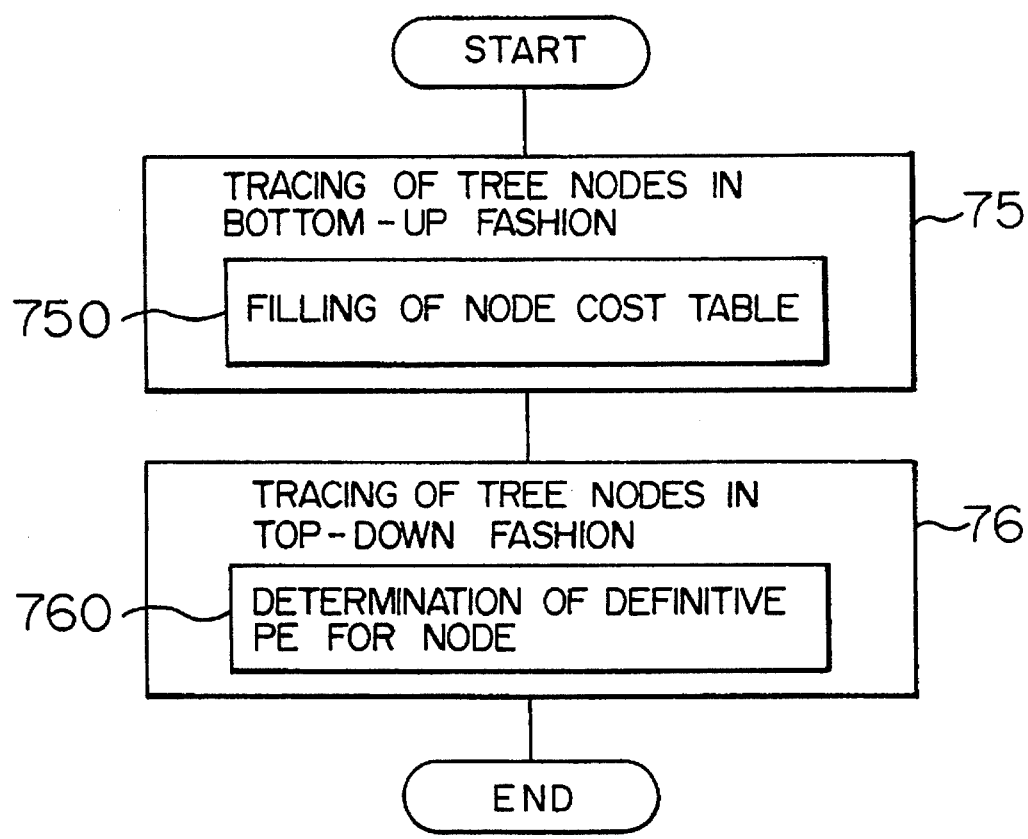
FIG. 36 is a flow chart illustrating the PE assignment processing considering transfer cost.
Figure 37B:
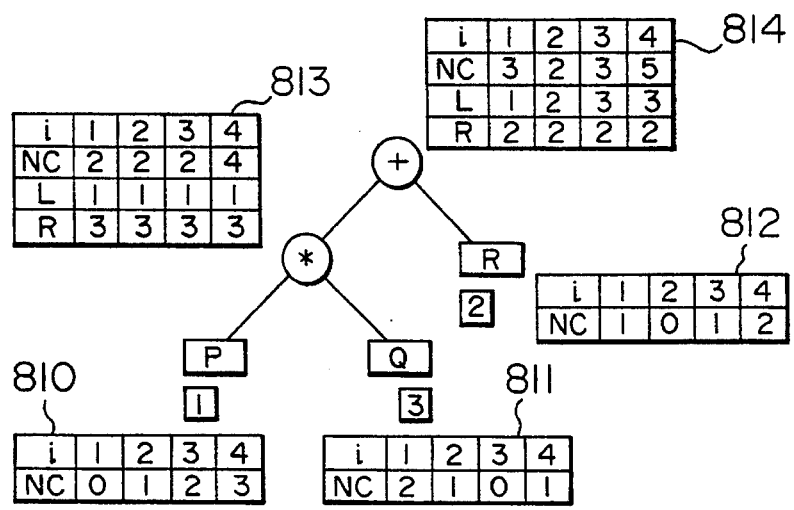

FIG. 36 is a flow chart illustrating the PE assignment processing according to the instant embodiment of the invention. Referring to the figure, the individual nodes of the tree are traced in a bottom-up fashion to prepare node cost tables 810 to 814 shown in FIG. 37B for the nodes, respectively, in a step 750. Subsequently, in a step 76, the nodes of the tree are traced in a top-down fashion to determine the definitive PE identifier for each of the nodes in a step 760.

The node cost tables 810 to 814 each represent the quantity of the node cost NC(n, i) . Besides, there are contained in the node cost tables 813 and 814 for the interior nodes such identifiers as left PE identifier L(n, i) and right PE identifier R(n, i) . The node cost NC(n, i) represents a minimum value of a sum of the transfer costs for the links of a subtree having a root at a node n on the condition that the node n is affixed with the definitive PE identifier i. The node cost NC(n, j) is determined in accordance with rules mentioned below while tracing the tree in a bottom-up fashion in the step 75 shown in FIG. 36. Namely, when the node n is a leaf, then the node cost is determined in accordance with NC(n, j)=TC(PN(n), i)

where PN(n) denotes the absolute PE identifier of the PE allocated with the data represented by the leaf n. When the node n is an interior node, then NC(n, i)=MINj(NC(LCHILD(n),j)+TC(j, i)) +MINk(NC(RCHILD(n),k)+TC(k, i))

where LCHILD(n) and RCHILD(n) denote the left and right children nodes, respectively, of the interior node n and MINi( ) and MINk( ) represent minimum values of the parenthesized quantities for the absolute PE identifiers j and k, respectively. It is further assumed that the absolute PE identifiers j and k are represented by the left PE identifier L(n, i) and the right PE identifier R(n, i). The node cost tables 810 to 814 shown in FIG. 37B have been determined in this manner.

Figure 37C:
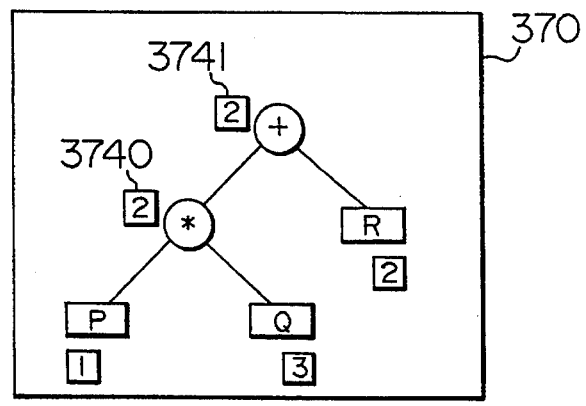

The rule for determining the definitive PE identifier for the node n in the step 760 shown in FIG. 36 is established such that when the node n is a root node, the PE identifier i which can minimize the cost NC(n, i) is determined to be the definitive PE identifier. For each of the interior nodes n inclusive of the root, once the definitive PE identifiers are determined to be i, the definitive PE identifiers for the relevant left and right children nodes are determined as the left PE identifier L(n, i) and the right PE identifier R(n, i), respectively. The definitive PE identifiers 3740 and 3741 shown in FIG. 37C have been determined in this way.

As will be appreciated from the foregoing, according to the PE assignment methods taught by the invention, the value of an expression realized by data allocated distributively to the PEs of a parallel computer system can be determined with the number of data transfers as required being reduced to a minimum, as a result of which the time required for evaluating the expression can be shortened, whereby execution efficiency can significantly be improved.

Further, by applying the PE assignment method according to the invention to a parallelizing tool such as a parallelizing compiler, there can be created a parallel computer program which enjoys a high efficiency in execution thereof.

What is claimed is:

1. In a computer system comprising a plurality of processors each having a local memory, a method of assigning said plurality of processors to execute in parallel a plurality of operations for an expression represented by a plurality of operands stored in said local memories and said plurality of operations, said method comprising the steps of:

(a) representing said expression in a form of a tree having a plurality of leaf nodes and a plurality of interior nodes, said operands being assigned to said leaf nodes, and said operations being assigned to said interior nodes, and assigning a processor having a local memory which stores an operand represented by a leaf node to said leaf node;

(b) tracing said tree in a bottom-up fashion for determining a set of candidate processors to be assigned to each of said plurality of interior nodes for executing an operation assigned to each of said plurality of interior nodes, from a set of processors which are assigned to children nodes of said each interior node in accordance with a majority method, said majority method being based on a rule that a processor which is most frequently assigned to the children nodes of said each interior node is determined as a candidate processor;

(c) determining definitively a root processor to be assigned to a root node of said interior nodes of said tree by arbitrarily selecting one of the candidate processors determined for said root node when a plurality of candidate processors are determined for said root node in the above step (b); and (d) tracing said tree in a top-down fashion to determine definitively one of the candidate processors determined for each of the interior nodes as a determined processor to be assigned to execute the operation at each of said interior nodes (i) when a processor assigned to a parent node of said each interior node is contained in the set of candidate processors of said each interior node, the processor assigned to said parent node is selected as the processor to be assigned to said each interior node; and (ii) when the processor assigned to the parent node of said each interior node is not contained in the set of the candidate processors of said each interior node, a one processor of the set of candidate processors of said each interior node is arbitrarily selected to be definitively assigned to said each interior node.

2. A processor assigning method according to claim 1, wherein when said majority method cannot determine a most frequently assigned processor assigned to said children nodes of said each interior node in said step (b), all the candidate processors for said children nodes of said each interior node are selected to be candidate processors for said each interior node.

3. (Twice Amended) A processor assigning method according to claim 1, wherein the representing step (a) includes a step of obtaining said expression to be executed by assembling together a plurality of expressions while eliminating an operand used temporarily.

4. In a computer system comprising a plurality of processors each having a local memory, a method of assigning said plurality of processors to execute in parallel each of a plurality of operations for an expression represented by a plurality of operands stored in said local memories and said plurality of operations, comprising the steps of:

(a) representing each operand of the expression as each of a plurality of leaf nodes of a tree and representing each of said plurality of operations as each of a plurality of interior nodes of said tree and assigning a processor having a local memory which stores an operand represented by a leaf node to said leaf node;

(b) merging together a plurality of interior nodes corresponding to a plurality of operations whose execution order is permutable so that a number of said interior nodes is reduced;

(c) tracing said tree in a bottom-up fashion for determining candidate processors to be assigned to each of a reduced number of interior nodes, from among processors which are assigned to children nodes of said each interior node for execution of the operation assigned to said each interior node using a majority method which has a rule that a processor which is most frequently assigned to the children nodes of said each interior node is determined as a candidate processor for said each interior node;

(d) determining definitively a root processor to be assigned to a root node of said interior nodes of said tree by arbitrarily selecting one of candidate processors determined for said root node when a plurality of candidate processors are determined for said root node in the above step (c); and (e) tracing said tree in a top-down fashion to determine definitively one of the candidate processors determined for each of the interior nodes as a processor to be assigned to execute the operation at each of said interior nodes, (i) when a processor assigned to a parent node of said each interior node is contained in the set of candidate processors of said each interior node, the processor assigned to said parent node is selected as the processor to be assigned to said each interior node; and (ii) when the processor assigned to the parent node of said each interior node is not contained in the set of the candidate processors of said each interior node, a one processor of the candidate processors of said each interior node is arbitrarily selected to be definitively assigned to said each interior node.

5. In a computer system comprising a plurality of processors each having a local memory, an apparatus for assigning said plurality of processors to execute a plurality of operations involved in executing an expression stated by using a plurality of operands stored previously in said local memories in precedence to execution of said expression which includes said plurality of operations and said plurality of operands, said apparatus comprising:

means for representing said expression to be executed in form of a tree having a plurality of leaf nodes corresponding to said operands and interior nodes corresponding to said plurality of operations, respectively and means for assigning a processor having a local memory which stores an operand represented by a leaf node to said lead node;

means for tracing said tree in a bottom-up fashion to determine in accordance with a majority method a set of candidate processors to be assigned to execute an operation of each of the interior nodes, from among processors which are assigned to children nodes of said each interior node, said majority method having a rule that a processor which is most frequently assigned to the children nodes of said each interior node is determined as a candidate processor;

means for determining definitively a root processor to be assigned to a root node of the interior node of said tree by arbitrarily selecting said root processor from the candidate processors determined for said root node when a plurality of candidate processors are determined for said root node; and means for tracing said tree in a top-down fashion to determine definitively at each of the interior nodes one processor of the candidate processors determined for said each interior node to execute the operation for said each interior node, (i) when a processor assigned to a parent node of said each interior node is contained in a set of candidate processors of said each interior node, the processor assigned to said parent node is selected as the processor to be assigned to said each interior node; and (ii) when the processor assigned to the parent node of said each interior node is not contained in the set of the candidate processors of said each interior node, a one processor of the candidate processors of said each interior node is arbitrarily selected to be definitively assigned to said each interior node.

6. A parallel computer system, comprising:

a plurality of processors for executing distributively in parallel a plurality of operations involved in execution of an expression to be executed, said expression including said plurality of operations and a plurality of operands;

a plurality of local memories for said plurality of processors, respectively, for storing the operands of said expression to be executed; and an apparatus for assigning said plurality of processors to execute a plurality of operations involved in execution of said expression in precedence to executing said operations of said expression by using said operands, said apparatus comprising:

means for representing said expression to be executed in a form of a tree having a plurality of leaf nodes corresponding to said operands and interior nodes corresponding to said plurality of operations, respectively, for assigning a processor having a local memory which stores an operand represented by a leaf node to said leaf node;

means for tracing said tree in a bottom-up fashion to determine in accordance with a majority method a set of candidate processors to be assigned to the execution of the operation of each of said interior nodes, said majority method having a rule that a processor which is most frequently assigned to the children nodes of said each interior node is determined as a candidate processor;

means for determining definitively an arbitrarily selected root processor from candidate processors determined for a root node of said interior nodes of said tree when a plurality of candidate processors are determined for said root node, and assigning said selected root processor to said root node; and means for tracing said tree in a top-down fashion and means for determining definitively at each of the interior nodes while tracing fin said top-down fashion, one of the candidate processors determined for said each interior node being determined as a processor to be assigned to execute the operation of each interior node, (i) when a processor assigned to a parent node of said each interior node is contained in a set of candidate processors of said each interior node, the processor assigned to said parent node is selected as the processor to be assigned to said each interior node; and (ii) when the processor assigned to the parent node of said each interior node is not contained in the set of the candidate processors of said each interior node, a one processor of the candidate processors of said each interior node is arbitrarily selected to be definitively assigned to said each interior node.

* * * * *